(12) United States Patent
Matsushima et al.

(10) Patent No.: US 8,308,189 B2
(45) Date of Patent: Nov. 13, 2012

(54) KNEE AIRBAG FOR VEHICLE

(75) Inventors: Hitoshi Matsushima, Nishikamo-gun (JP); Osamu Fukawatase, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/203,373

(22) PCT Filed: Mar. 10, 2009

(86) PCT No.: PCT/JP2009/054579
§ 371 (c)(1),
(2), (4) Date: Aug. 25, 2011

(87) PCT Pub. No.: WO2010/103622
PCT Pub. Date: Sep. 16, 2010

(65) Prior Publication Data
US 2012/0018987 A1    Jan. 26, 2012

(51) Int. Cl.
*B60R 21/206* (2011.01)
(52) U.S. Cl. .......... 280/732; 280/730.1; 180/90; 296/70
(58) Field of Classification Search ................. 280/732, 280/730.1, 728.2; 180/90; 296/70
See application file for complete search history.

(56) References Cited

U.S. PATENT DOCUMENTS

| | | | |
|---|---|---|---|
| 5,230,530 A | 7/1993 | Iriyama et al. | |
| 6,276,713 B1 | 8/2001 | Duletzke | |
| 6,302,437 B1 * | 10/2001 | Marriott et al. | 280/732 |
| 6,416,079 B1 * | 7/2002 | Lutz et al. | 280/730.1 |
| 6,631,920 B1 * | 10/2003 | Webber et al. | 280/730.1 |
| 6,705,638 B2 * | 3/2004 | Abe et al. | 280/730.1 |
| 6,715,789 B2 | 4/2004 | Takimoto et al. | |
| 6,817,627 B2 * | 11/2004 | Galmiche et al. | 280/730.1 |
| 6,971,667 B2 * | 12/2005 | Enders et al. | 280/730.1 |
| 7,393,013 B2 * | 7/2008 | Best et al. | 280/752 |
| 7,481,457 B2 * | 1/2009 | Best et al. | 280/752 |

(Continued)

FOREIGN PATENT DOCUMENTS

DE    42 09 604 A1    10/1992

(Continued)

OTHER PUBLICATIONS

International Search Report issued in Application No. PCT/JP2009/054579; Dated Jun 16, 2009 (With Translation).

(Continued)

*Primary Examiner* — Drew Brown
(74) *Attorney, Agent, or Firm* — Oliff & Berridge, PLC

(57) ABSTRACT

A knee airbag is provided to the lower part of a glove box door, and an airbag door provided to the glove box door opens in both upward and downward directions when the knee airbag expands. As the knee airbag expands, the rigidity of the lower part of the glove box door decreases, and this causes a relatively small reaction force, which corresponds to a relatively small load generated when the knees of an occupant having a relatively small body build make contact with the lower part, to be generated on the lower part of the glove box door. On the other hand, because the knee airbag is not provided to the upper part of the glove box door, the upper part can generate a relatively large reaction force which corresponds to a relatively large load generated when the knees of an occupant having a relatively large body build make contact with the upper part via the knee airbag.

9 Claims, 11 Drawing Sheets

U.S. PATENT DOCUMENTS

| | | | |
|---|---|---|---|
| 7,513,528 B2* | 4/2009 | Penner | 280/752 |
| 7,878,532 B2* | 2/2011 | Sasaki et al. | 280/730.1 |
| 7,950,688 B2* | 5/2011 | Kotikovsky | 280/728.2 |
| 2007/0182189 A1* | 8/2007 | Penner | 296/37.12 |
| 2009/0079170 A1* | 3/2009 | Bito et al. | 280/730.1 |
| 2010/0327566 A1* | 12/2010 | Matsushima | 280/728.2 |
| 2011/0156378 A1* | 6/2011 | Matsushima et al. | 280/730.1 |
| 2011/0204603 A1* | 8/2011 | Fukawatase et al. | 280/730.1 |

FOREIGN PATENT DOCUMENTS

| | | |
|---|---|---|
| JP | A-02-299951 | 12/1990 |
| JP | A-2002-347565 | 12/2002 |
| JP | A-2003-040072 | 2/2003 |
| JP | A-2003-170799 | 6/2003 |
| JP | B2-3767497 | 4/2006 |
| JP | A-2007-161090 | 6/2007 |
| JP | A-2008-280151 | 11/2008 |
| JP | A-2009-067090 | 4/2009 |
| JP | A-2010-105558 | 5/2010 |

OTHER PUBLICATIONS

Office Action dated Nov. 8, 2011 issued in Japanese Patent Application No. 2011-503595 (with translation).

* cited by examiner

KNEE AIRBAG FOR VEHICLE

TECHNICAL FIELD

The present invention relates to a knee airbag device for a vehicle that, at the time of a collision, inflates and expands a knee airbag and restrains the knees of a passenger.

BACKGROUND ART

There are disclosed structures in which a knee airbag module having a knee airbag and an inflator is built into the door of a glove box (a glove box door) (refer to Patent Document 1 and Patent Document 2).
Patent Document 1: German Patent Application Laid-Open No. 4209604
Patent Document 2: U.S. Pat. No. 6,276,713

DISCLOSURE OF THE INVENTION

Technical Problem

Here, when a knee airbag device is built into a glove box door as in the techniques disclosed in the aforementioned prior art, rigidity, such that the glove box door can withstand the reaction force at the time of expansion of the knee airbag and the pressing force applied at the time when the knee airbag receives the knees of the passenger, is required of the glove box door. Further, when the glove box door receives the load applied to the knee airbag from the knees of the passenger, due to the glove box door generating a predetermined reaction force, the knees of the passenger are restrained and protected.

However, when the body build of the passenger is large, a relatively large load is applied to the upper portion of the glove box door, and, when the body build of the passenger is small, a relatively small load is applied to the lower portion of the glove box door. As a result, in order to generate a predetermined reaction force at the glove box door at the time of application of load and to restrain and protect the knees of passengers of different body builds, the shape and material and the like of the glove box door must be considered. However, there is the need to ensure rigidity of a definite level or more, due to ensuring of the heat-resistance performance and the like.

In view of the above-described circumstances, an object of the present invention is to provide a knee airbag device for a vehicle in which reaction force that corresponds to the body build of a passenger can be generated at a glove box door.

Solution to Problem

The knee airbag device for a vehicle relating to the invention of claim 1 comprises: a knee airbag that, due to gas being supplied, inflates and is expanded toward a vehicle rear side; and a glove box door that is provided so as to be able to open and close a glove box, and in which the knee airbag is accommodated in a folded-up state, and further, at which a rigidity of a lower portion is set to be lower than a rigidity of an upper portion.

The knee airbag device for a vehicle relating to the invention of claim 2 has the feature that, in the invention recited in claim 1, an airbag module that is structured to include the knee airbag is accommodated within the glove box door at a position that is offset, toward a vehicle lower side, with respect to a central position in a door height direction of the glove box door.

The knee airbag device for a vehicle relating to the invention of claim 3 has the feature that, in the invention recited in claim 1 or claim 2, due to inflation reaction force at a time when the knee airbag inflates and expands, a vehicle front side of the lower portion of the glove box door is deformed in a curved surface shape that is convex in plan view.

The knee airbag device for a vehicle relating to the invention of claim 4 has the feature that, in the invention recited in any one of claim 1 through claim 3, a vehicle equipment part that is supported at a vehicle body is disposed adjacent to a vehicle front side of a main body portion of the glove box.

The knee airbag device for a vehicle relating to the invention of claim 5 has the feature that, in the invention recited in any one of claim 1 through claim 3, the glove box is supported, directly or via a bracket, at a vehicle body.

The knee airbag device for a vehicle relating to the invention of claim 6 has the feature that, in the knee airbag device for a vehicle recited in any one of claim 1 through claim 5, an instrument panel reinforcement, whose longitudinal direction is a vehicle transverse direction, is disposed at a vehicle front side and oblique upper side of the upper portion of the glove box door, and further, a load transmitting member that transmits, to the instrument panel reinforcement, load substantially toward a vehicle front side that is applied to the upper portion of the glove box door, is disposed between the instrument panel reinforcement and the upper portion of the glove box door.

The knee airbag device for a vehicle relating to the invention of claim 7 has the feature that the invention recited in any one of claim 1 through claim 6 includes: an upper rib that is formed within the upper portion of the glove box door and extends in a door thickness direction; and a lower rib that is formed within the lower portion of the glove box door and extends in the door thickness direction, wherein, further, a rigidity of the lower rib is set to be low as compared with the upper rib.

The knee airbag device for a vehicle relating to the invention of claim 8 has the feature that, in the invention recited in claim 7, a thickness of the upper portion of the glove box door is set to be thicker than a thickness of the lower portion.

The knee airbag device for a vehicle relating to the invention of claim 9 has the feature that, in the invention recited in any one of claim 1 through claim 8, a main body portion of the glove box is formed in a box shape whose upper surface side is open, and the glove box door is formed integrally with a vehicle rear side surface of the main body portion, and further, a reinforcing portion is provided at a portion of or an entirety of a peripheral edge portion of an upper end opening portion of the main body portion.

In accordance with the present invention recited in claim 1, when the time of a collision arrives, gas is supplied into the knee airbag that is in a folded-up state. Therefore, the knee airbag inflates and is expanded toward the vehicle rear side. As a result, the knees of a passenger seated in the seat are restrained at the knee airbag. Due thereto, the knees of that passenger are protected.

Here, when a passenger of a large body build (note that, in the present Description, "a passenger of a large body build" is a term used in contradistinction to "a passenger of a small body build" such as a child or a woman or the like, and includes both an adult passenger of a standard body build and an adult passenger whose body build is larger than a standard body build) is seated in the seat, the knees (meaning the "kneecaps", but hereinafter simple called "knees") of that passenger face the upper portion of the glove box door. Therefore, at the time of a collision, a relatively large load is applied to the upper portion of the glove box door via the knee airbag.

However, in the present invention, because the rigidity of the upper portion of the glove box door is set to be higher than the rigidity of the lower portion, a relatively large reaction force that corresponds to that large load is obtained.

On the other hand, when a passenger of a small body build is seated in the seat, the knees of that passenger face the lower portion of the glove box door. Therefore, at the time of a collision, a relatively small load is applied to the lower portion of the glove box door via the knee airbag. However, in the present invention, because the rigidity of the lower portion of the glove box door is set to be lower than the rigidity of the upper portion, a relatively large reaction force corresponding to that small load is obtained.

In accordance with the present invention recited in claim 2, the airbag module is accommodated within the glove box door at a position that is offset toward the vehicle lower side with respect to the central position in the door height direction of the glove box door, and therefore, at the time of a collision, when the device operates and the knee airbag inflates and expands toward the vehicle rear side, a space (cavity portion) is formed at the portion further toward the lower side than the upper portion of the glove box door. As a result, the rigidity of the portion further toward the lower side than the upper portion of the glove box door is reduced. Namely, accompanying the inflation and expansion of the knee airbag, the rigidity of the lower portion of the glove box door is reduced.

Moreover, in accordance with this structure, it suffices merely to offset the accommodated position of the airbag module within the glove box door further toward the vehicle lower side than the central position in the door height direction, and therefore, the number of parts does not increase. In other words, the present invention can be called the idea that, focusing on the intrinsic operation of the knee airbag device for a vehicle, if the knee airbag is inflated and expanded, the cavity portion is formed and the rigidity decreases at the portion where the knee airbag was folded-up and accommodated, and therefore, that decreased rigidity portion is made to match the height of the knees of a passenger of a small body build.

Further, by structuring in this way, at usual times, the knee airbag is folded-up and accommodated at a position that is offset, toward the vehicle lower side, with respect to the central position in the door height direction of the glove box door, and therefore, the needed rigidity of the glove box door overall is maintained.

In accordance with the present invention recited in claim 3, when the time of a collision arises in a case in which a passenger of a small body build is seated in the seat, load toward the vehicle front side is inputted to the lower portion of the glove box door via the knee airbag.

Here, generally, it is often the case that a passenger of a small body build is seated in the seat with the knees near to the design surface of the glove box door. However, in the present invention, due to the inflation reaction force at the time when the knee airbag inflates and expands, the vehicle front side of the lower portion of the glove box door is deformed in a curved surface shape that is convex in plan view, and therefore, the gap between the knees of that passenger and the floor portion of the glove box door is enlarged by that much. Accordingly, the knee airbag is inflated and expanded rapidly in the gap between the knees of that passenger and the glove box door.

In accordance with the present invention recited in claim 4, because a vehicle equipment part that is supported at the vehicle body is disposed adjacent to the vehicle front side of the glove box, when load toward the vehicle front side is inputted to the main body portion of the glove box via the glove box door, the main body portion of the glove box door interferes with the vehicle equipment part, and reaction force is transmitted to the glove box door.

Further, because the needed reaction force can be generated by utilizing a vehicle equipment part that originally exists at the vehicle, it does not lead to an increase in the number of parts.

In accordance with the present invention recited in the fifth aspect, because the glove box is supported at the vehicle body directly or via a bracket, the structure can be established also when a vehicle equipment part does not exist.

In accordance with the present invention recited in claim 6, when there is a collision in a case in which a passenger of a large body build is seated in the seat, a relatively large load is applied from the knees of that passenger via the knee airbag to the upper portion of the glove box door. This load is transmitted to and supported at the instrument panel reinforcement via the load transmitting member.

In accordance with the present invention recited in claim 7, when a passenger of a small body build is seated in the seat and a relatively small load is applied to the lower portion of the glove box door via the knee airbag, this load can be supported at the lower rib that extends in the door thickness direction within the lower portion of the glove box door and whose rigidity is low as compared with the upper rib. As a result, because a relatively small reaction force that corresponds to this load can be generated at the lower portion of the glove box door, the knees of a passenger of a small body build can be protected.

On the other hand, when a passenger of a large body build is seated in the seat and a relatively large load is applied to the upper portion of the glove box door via the knee airbag, this load can be supported at the upper rib that extends along the door thickness direction within the upper portion of the glove box door and whose rigidity is high as compared with the lower rib. As a result, because a relatively large reaction force that corresponds to this load can be generated at the upper portion of the glove box door, the knees of a passenger of a large body build can be restrained. Accordingly, a reaction force that corresponds to the body build of the passenger can be generated at the glove box door.

Further, because the difference in rigidity arises due to the ribs, the glove box door can be formed integrally at the time of molding. Accordingly, the glove box door is easy to manufacture, and tuning thereof also is easy.

In accordance with the present invention recited in claim 8, when a passenger of a small body build is seated in the seat and a relatively small load is applied to the lower portion of the glove box door via the knee airbag, this load is supported at the lower portion of the glove box door that is thin as compared with the thickness of the upper portion. As a result, because a relatively small reaction force that corresponds to this load can be generated at the lower portion of the glove box door, the knees of a passenger of a small body build can be protected.

On the other hand, when a passenger of a large body build is seated in the seat and a relatively large load is applied to the upper portion of the glove box door via the knee airbag, this load can be supported at the upper portion of the glove box door that is thick as compared with the thickness of the lower portion. As a result, because a relatively large reaction force that corresponds to this load can be generated at the upper portion of the glove box door, the knees of a passenger of a large body build can be protected. Accordingly, a reaction force that corresponds to the body build of the passenger can be generated at the glove box door.

Further, because the difference in rigidity arises due to the thickness of the glove box door, this is an effective means for designs in which the upper portion of the glove box door may be made to be thick as compared with the lower portion.

In accordance with the present invention recited in claim 9, because the main body portion of the glove box is formed in a box shape whose upper surface side is open, and the glove box door is formed integrally with the vehicle rear side surface of the main body portion, the rigidity of the upper surface side of the main body portion of the glove box tends to be low. Further, this region is the side at which a relatively large load is inputted when a passenger of a large body build is seated in the seat.

However, in the present invention, because the reinforcing portion is provided at a portion of or the entirety of the peripheral edge portion of the upper end opening portion of the main body portion of the glove box, it can compensate for the insufficient rigidity.

ADVANTAGEOUS EFFECTS OF INVENTION

As described above, the knee airbag device for a vehicle relating to the present invention recited in claim 1 has the excellent effect that reaction force corresponding to the body build of a passenger can be generated at a glove box door.

The knee airbag device for a vehicle relating to the present invention recited in claim 2 has the excellent effect that it is possible to, by a low-cost structure, devise the establishment of both generation of reaction force corresponding to the body build of a passenger at a glove box door, and ensuring of the needed rigidity that is required of a glove box door at usual times.

The knee airbag device for a vehicle relating to the present invention recited in claim 3 has the excellent effect that, when a passenger of a small body build is seated in the seat, the knees can be restrained and protected rapidly, at a low cost.

The knee airbag device for a vehicle relating to the present invention recited in claim 4 has the excellent effect that reaction force corresponding to the body build of a passenger can be generated at a glove box door, at a low cost.

The knee airbag device for a vehicle relating to the present invention recited in claim 5 has the excellent effect that, also when a member that is just right for obtaining reaction force does not exist at the vehicle front side of the glove box, reaction force corresponding to the body build of a passenger can be generated at a glove box door.

The knee airbag device for a vehicle relating to the present invention recited in claim 6 has the excellent effect that reaction force can be generated even more effectively in the case of a passenger of a large body build.

The knee airbag device for a vehicle relating to the present invention recited in claim 7 has the excellent effects that manufacturability is good, and fine rigidity adjustment also is possible.

The knee airbag device for a vehicle relating to the present invention recited in claim 8 has the excellent effect that it is easily established in accordance with the vehicle type, and in this sense, can provide for an abundance of designs.

The knee airbag device for a vehicle relating to the present invention recited in claim 9 has the excellent effect that, even with respect to a glove box whose upper surface side is open, reaction force corresponding to the body build of a passenger can be generated at a glove box door.

BEST MODES FOR CARRYING OUT THE INVENTION

First Embodiment

A first embodiment of a knee airbag device for a vehicle relating to the present invention is described hereinafter by using FIG. 1 through FIG. 5. Note that arrow FR shown appropriately in these drawings indicates the vehicle front side, arrow UP indicates the vehicle upper side, and arrow IN indicates the vehicle transverse direction inner side.

Figure 1:
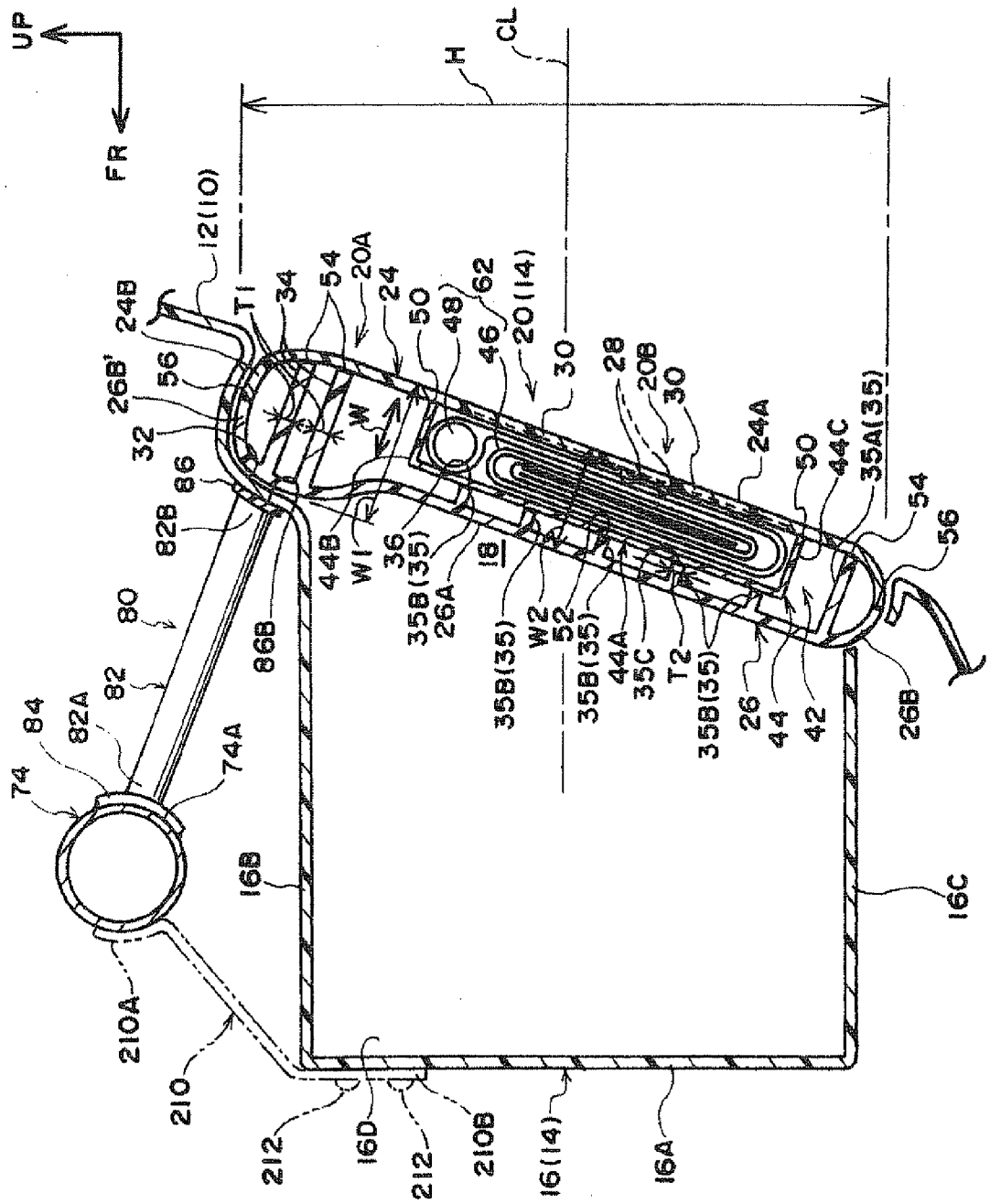
FIG. 1 is an enlarged vertical sectional view taken along line 1-1 of FIG. 3 and showing the overall structure in an assembled state of a glove box door built-in-type knee airbag device relating to a first embodiment.
Figure 2:
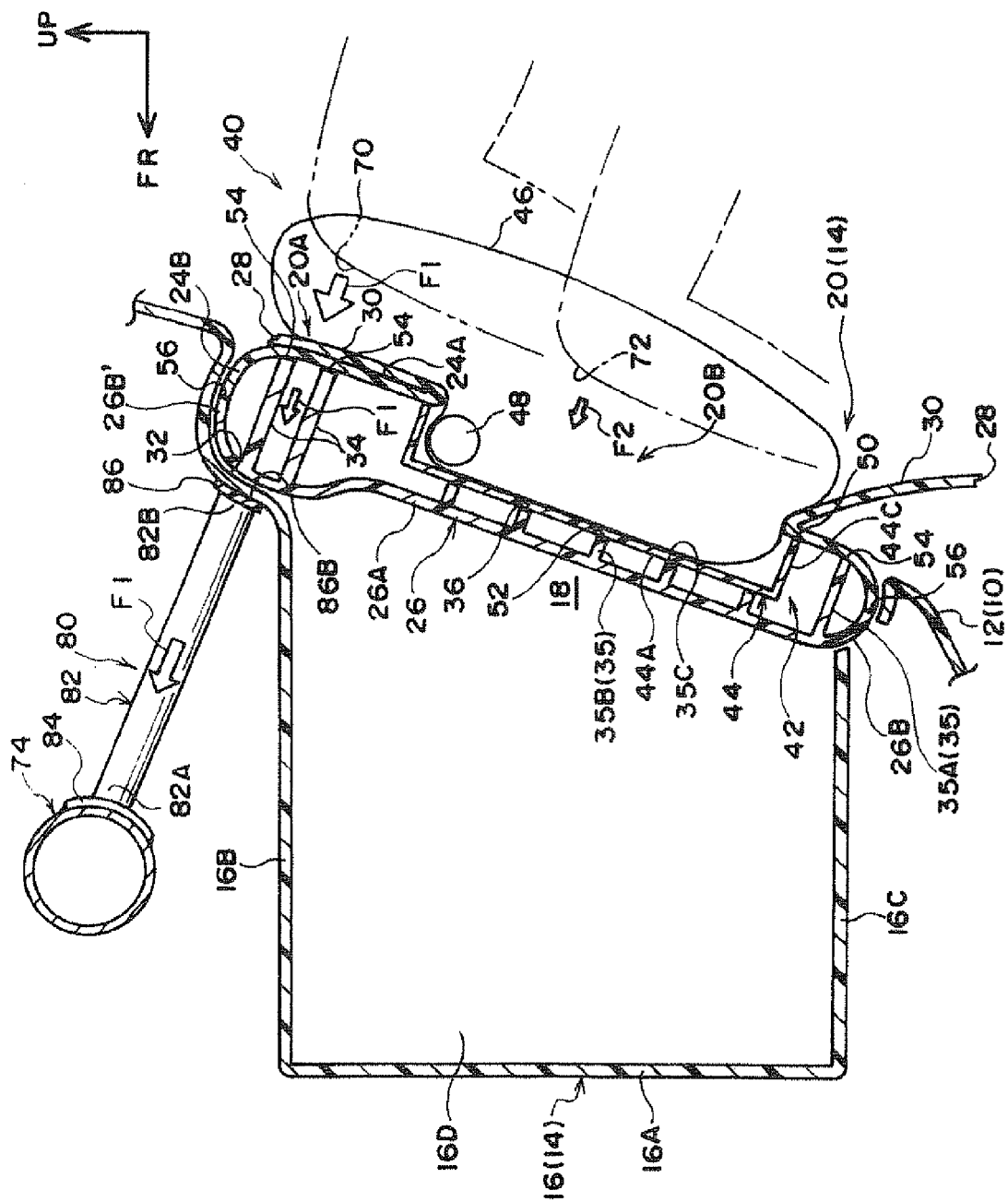
FIG. 2 is an enlarged vertical sectional view corresponding to FIG. 1 and showing a state in which the knee airbag device shown in FIG. 1 is operated and a knee airbag is expanded.
Figure 3:
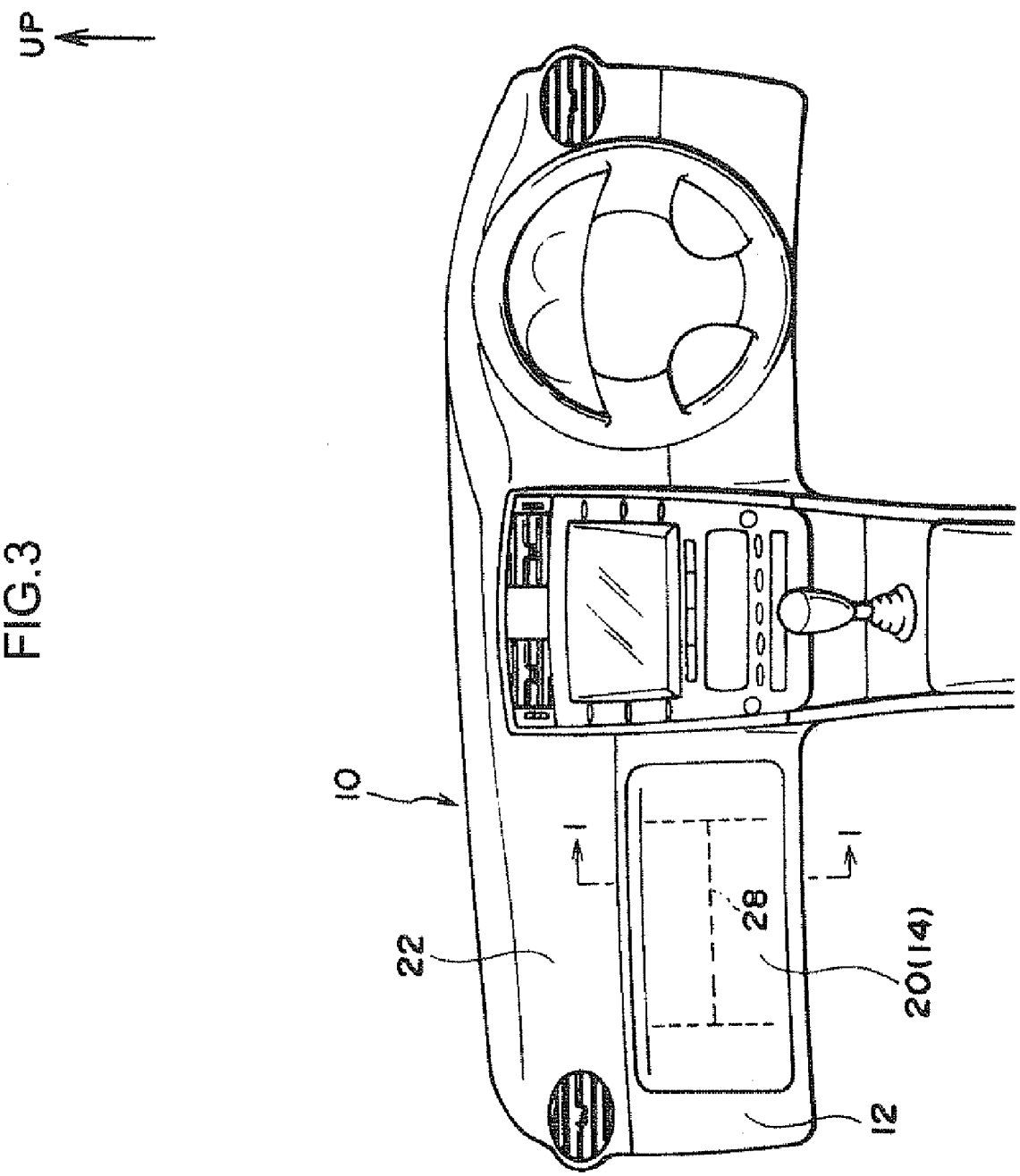
FIG. 3 is a front view seen from a vehicle cabin interior and showing a vicinity of an instrument panel of a vehicle in which the knee airbag device shown in FIG. 1 is installed.
Figure 4:
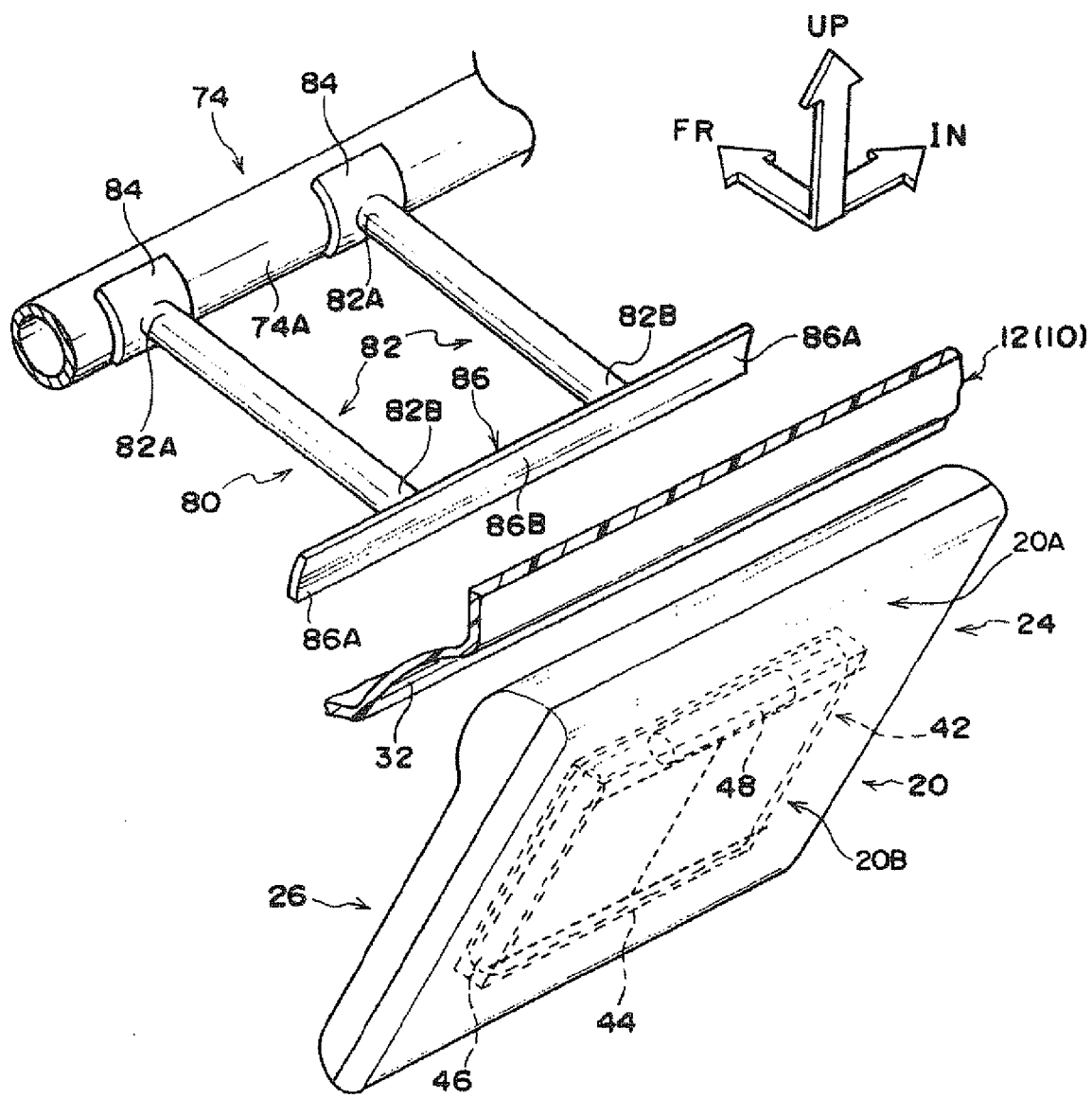
FIG. 4 is an exploded perspective view showing the placement relationships between a glove box door, that is equipped with the knee airbag device shown in FIG. 1, and peripheral members.
Figure 5:
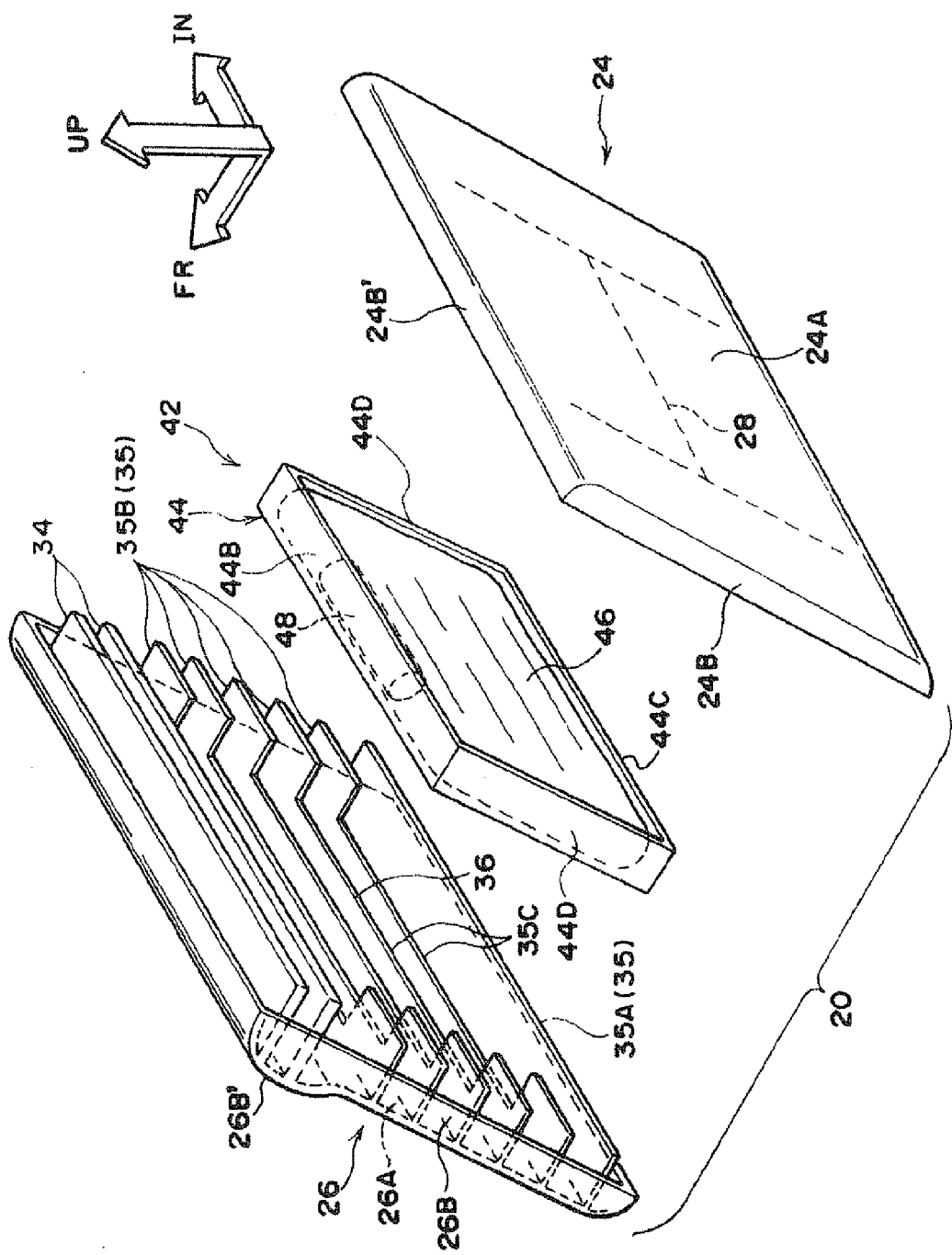
FIG. 5 is an exploded perspective view of the glove box door shown in FIG. 1.

An enlarged sectional view taken along the 1-1 sectional line of FIG. 3 and showing the overall structure in an assembled state of a glove box door built-in-type knee airbag device relating to the present embodiment, is shown in FIG. 1. Further, a sectional view of a state in which the glove box door built-in-type knee airbag device shown in FIG. 1 is operated and a knee airbag is expanded, is shown in FIG. 2, and a front view seen from a vehicle cabin interior and showing a vicinity of an instrument panel in which the glove box door built-in-type knee airbag device is installed, is shown in FIG. 3. Moreover, an exploded perspective view showing the glove box door built-in-type knee airbag device relating to the present embodiment and peripheral members is shown in FIG. 4, and an exploded perspective view of a glove box door of the glove box door built-in-type knee airbag device relating to the present embodiment is shown in FIG. 5.

As shown in FIG. 3, a glove box 14 for placing small items is disposed at a position opposing the knees of a passenger at the front passenger's seat side of an instrument panel 10 (more accurately, at the upper portion of an instrument panel lower 12 that structures the lower portion of the instrument panel 10).

As shown in FIG. 1, the glove box 14 is structured by a glove box main body 16 that serves as a main body portion and is made of resin and is formed in the shape of a box, and a glove box door 20 that opens and closes an opening portion 18 of the glove box main body 16.

The glove box main body 16 is disposed such that the opening portion 18 faces the vehicle rear side (the vehicle cabin inner side), and is structured by a floor wall portion (front wall portion) 16A, an upper wall portion 16B, a lower wall portion 16C, and a pair of left and right side wall portions 16D. The front-back length of the lower wall portion 16C is set to be shorter than the front-back length of the upper wall portion 16B, and due thereto, the opening portion 18 of the glove box main body 16 runs along an instrument panel upper 22 (see FIG. 3), that structures the upper portion of the instrument panel 10, and a design surface (a rounded curved surface) that has continuity with the instrument panel lower 12 that is continuous with the instrument panel upper 22.

Further, the outer contour of the glove box door 20 that closes the opening portion 18 of the glove box main body 16 is structured by a glove box door outer 24, that is made of resin and is disposed at the vehicle cabin inner side and forms the design surface, and a glove box door inner 26, that is made of resin and is disposed at the vehicle front side of this glove box door outer 24 and is made integral with the glove box door outer 24.

As shown in FIG. 5, the glove box door outer 24 is formed in a substantially rectangular tray shape. More concretely, the glove box door outer 24 is structured by a glove box door outer general portion 24A that is substantially rectangular flat plate shaped and structures the design surface, and a glove box door outer peripheral wall portion 24B that stands from the outer peripheral four sides of the glove box door outer general portion 24A. Moreover, a fracture portion (tear line) 28, that is set in an H shape as seen from the glove box main body 16 side, is formed in the reverse surface side of the glove box door outer general portion 24A (the surface at the vehicle front side that faces the glove box door inner 26). The fracture portion 28 is structured as a thin-walled portion, and when the bag expansion pressure that is applied to the fracture portion 28 reaches a predetermined value, the glove box door outer general portion 24A fractures along the fracture portion 28, and airbag doors 30 (see FIG. 2) are expanded so to open both upward and downward. Note that the fracture portion may be structured as an invisible type in which the fracture portion 28 cannot be seen from the exterior (the passenger side) such as the glove box door 20, or the glove box door general portion may be made to be thin-walled from both the obverse and reverse surface sides and the fracture portion may be structured as a visible type in which the fracture portion can be seen from the exterior (the passenger side).

On the other hand, the glove box door inner 26 as well is formed in a tray shape of a size that can be fit with the glove box door outer 24. Accordingly, in the same way as the glove box door outer 24, the glove box door inner 26 as well has a glove box door inner general portion 26A that is substantially rectangular flat plate shaped and is disposed substantially parallel to the glove box door outer general portion 24A, and a glove box door inner peripheral wall portion 26B that stands from the outer peripheral four sides of the glove box door inner general portion 26A. Note that the floor is formed to be deeper at the glove box door inner 26 than at the glove box door outer 24. Further, an upper portion 26B' of the glove box door inner peripheral wall portion 26B swells in a substantially semicircular shape toward the vehicle front side in side view (as seen from the vehicle transverse direction).

As shown in FIG. 1, a concave portion 32, that can accept the upper portion 26B' of the glove box door inner peripheral wall portion 26B, is formed in the cabin inner side end portion of the upper wall portion 16B of the glove box main body 16.

Further, the upper portion 26B' of the glove box door inner peripheral wall portion 26B and the concave portion 32 are disposed so as to overlap in the force input direction at the time of a collision (i.e., the application direction of the expansion reaction force at the time of expansion of a knee airbag 46 that is described later, which is also the direction in which the knees of the passenger push the knee airbag 46).

Further, upper ribs 34 for reinforcement, that are formed in plate shapes of narrow widths, are formed integrally over plural vertical stages (two stages in the present embodiment), at the upper portion of the interior of the glove box door inner 26. Lower ribs 35 for reinforcement, that are formed in plate shapes of narrow widths, are formed integrally over plural vertical stages at the lower portion of the interior of the above-described glove box door inner 26.

The upper ribs 34 and the lower ribs 35 are formed so as to span between both left and right side walls of the glove box door inner peripheral wall portion 26B, and are also connected to the glove box door inner general portion 26A. Accordingly, the upper ribs 34 and the lower ribs 35 are structured so as to be connected to inner side surfaces of the glove box door inner 26 at three outer peripheral sides thereof. However, because the heights of the upper ribs 34 and the lower ribs 35 are set to be greater than the depth (length) of the glove box door inner 26, the respective distal end portions of the upper ribs 34 and the lower ribs 35 are disposed in states of projecting-out by predetermined lengths from the glove box door inner peripheral wall portion 26B.

As shown in FIG. 2, an upper portion 20A of the glove box door 20 at which the upper ribs 34 are formed is the region upward of a door height direction central position of the glove box door 20, and is a region where load (arrow F1 in FIG. 2) from knees 70 of a passenger of a large body build is applied from the vehicle lower rear side toward the vehicle upper front side. On the other hand, a lower portion 20B of the glove box door 20 where the lower ribs 35 are formed is the region downward of the vertical direction center of the glove box door 20, and is a region where load (arrow F2 in FIG. 2) from knees 72 of a passenger of a small body build is applied from the vehicle lower rear side toward the vehicle upper front side.

As shown in FIG. 1, an airbag module 62, that is structured to include the knee airbag 46 and an inflator 48, is accommodated within the glove box door 20 at a position that is offset toward the vehicle lower side with respect to a central position CL (a position at ½ of a height H of the glove box door 20) in a door height direction (the vehicle vertical direction) of the glove box door 20. Further, a front-back direction thickness W1 of the upper portion 20A of the glove box door 20 is thick as compared with a front-back direction thickness W2 of the lower portion 20B of the glove box door 20. Moreover, as shown in FIG. 2, the inflator 48 is disposed at the upper portion of a module case 44, and the knee airbag 46 in a folded-up state is disposed beneath the inflator 48, and the knee airbag 46 is inflated and expanded between the glove box door 20 and the knees of the passenger, so as to span between the upper portion 20A and the lower portion 20B of the glove box door 20. Therefore, the rigidity of the upper portion 20A of the glove box door 20 with respect to load applied in the thickness direction of the glove box door 20 (arrow W direction in FIG. 1) is high as compared with the rigidity of the lower portion 20B.

Further, a plate thickness T1 of the upper ribs 34 is thick as compared with a plate thickness T2 of the lower ribs 35. Therefore, the rigidity of the upper ribs 34 with respect to load applied in the thickness direction of the glove box door 20 (the arrow W direction in FIG. 1) is high as compared with the rigidity of the lower ribs 35.

Note that the direction of thickness of the glove box door 20 is the direction in which loads F1, F2 are applied.

Further, an instrument panel reinforcement 74 is disposed in the direction of the vehicle upper front side with respect to the concave portion 32 of the instrument panel lower 12. The instrument panel reinforcement 74 is structured by a pipe member that is disposed such that the longitudinal direction thereof runs along the vehicle transverse direction, and is a vehicle body side structural member that supports the instrument panel 10 and the like.

Further, between the instrument panel reinforcement 74 and the upper portion 20A of the glove box door 20, a load transmitting bracket 80 serving as a load transmitting member is disposed along the application direction of the load F1 (see FIG. 2), obliquely from the vehicle lower rear side toward the vehicle upper front side.

As shown in FIG. 4, the load transmitting bracket 80 has main body portions 82 that are formed from plural (two) pipe members that are disposed in parallel at a predetermined interval in the vehicle transverse direction. A mounting portion 84, whose shape viewed from the vehicle transverse direction is arc-shaped, is mounted by welding or the like to each front end portion (end portion at the vehicle front side) 82A of the pair of left and right main body portions 82. Further, this pair of left and right mounting portions 84 is mounted by welding or the like to an outer peripheral wall portion 74A of the instrument panel reinforcement 74, respectively.

On the other hand, a load receiving portion 86, whose shape viewed from the vehicle transverse direction is a gently curved shape, is mounted to rear end portions (end portions at the vehicle rear side) 82B of the main body portions 82. The load receiving portion 86 is formed in a shape that is elongated along the vehicle transverse direction. The rear end portions 82B of the main body portions 82 are mounted by welding or the like to the front surface of vicinities of vehicle transverse direction both end portions 86A of the load receiving portion 86, respectively. Further, a vehicle rear wall portion 86B of the load receiving portion 86 opposes the upper portion 20A of the glove box door 20 with the concave portion 32 of the instrument panel lower 12 sandwiched therebetween. The shape of the load receiving portion 86 as viewed from the vehicle transverse direction is a curved shape that runs along the concave portion 32 of the instrument panel lower 12. Moreover, the load receiving portion 86 is disposed in a state of abutting or being adjacent to the concave portion 32.

Accordingly, a portion of the load F1 (see FIG. 2), that is applied to the upper portion 20A of the glove box door 20 via the knee airbag 46, is transmitted to the load transmitting bracket 80 with the concave portion 32 of the instrument panel lower 12 therebetween, and is transmitted to the instrument panel reinforcement 74 via the load transmitting bracket 80.

Note that a portion of the load F1 that is applied to the upper portion 20A of the glove box door 20 is transmitted to and supported at the instrument panel 10 as well, via the glove box main body 16.

Due to the above-described structure, at the upper portion 20A of the glove box door 20, a relatively large reaction force that corresponds to the load F1 can be generated, and therefore, the knees 70 of a passenger of a large body build can be reliably held.

On the other hand, at the lower portion 20B of the glove box door 20, the airbag doors 30 (see FIG. 4) are expanded so as to open both upward and downward.

Therefore, the load F2 (see FIG. 2), that is applied to the lower portion 20B of the glove box door 20 via the knee airbag 46, is supported at the lower ribs 35 that are disposed at the vehicle front side of the airbag doors 30 after expansion.

Note that the load F2, that is applied to the lower portion 20B of the glove box door 20, is, via the glove box main body 16, transmitted to and supported at the instrument panel 10. However, in the state in which the knee airbag 46 is expanded, the rigidity of the lower portion 20B is lower than the rigidity of the upper portion 20A by an amount corresponding to the amount by which the knee airbag 46 does not exist, and therefore, the lower portion 20B flexes in a convex curved shape that is convex toward the vehicle front side as seen in plan view.

Due to the above-described structure, the rigidity of the lower portion 20B at the glove box door 20 decreases accompanying the expansion of the knee airbag 46, and therefore, at the lower portion 20B of the glove box door 20, a relatively small reaction force that corresponds to the load F2 can be generated. As a result, the knees 72 of a passenger of a small body build can be protected effectively.

As shown in FIG. 5, the upper ribs 34, and a lower rib 35A that is disposed at the lowest stage among the lower ribs 35, are set to have the same height, whereas other lower ribs 35B are a shape in which the intermediate portion is cut in a rectangular shape and the both end portions remain. Due thereto, a concave portion 36, that is substantially rectangular in plan view and whose depth (length) is set to a predetermined depth (length dimension), is formed in the central portion of the lower rib 35B.

An airbag module 42 is disposed in the above-described concave portions 36, and the airbag module 42 is structured with the main portions thereof being the module case 44 that is made of resin and formed in a box shape, the knee airbag 46 that is accommodated in a folded-up state within the module case 44, and the inflator 48 that is cylindrical and disposed at the upper end side of the module case 44. Note that, in this embodiment, the knee airbag 46 is folded-up by being folded by rolling, but may be folded-up by being folded in a bellows-like form, or may be folded-up by a combination of the both. Further, in this embodiment, the inflator 48, that is an element that is understood in a wide sense as a gas generating means, is disposed at the upper end side of the module case 44 interior, but is not limited to this, and the inflator may be disposed at the lower end side or the vertical direction intermediate portion of the module case 44 interior, or the inflator may be set at the exterior of the glove box door and this inflator and the knee airbag 46 may be communicated by a tube or the like.

The aforementioned module case 44 has a floor wall portion 44A that is rectangular flat plate shaped, an upper wall portion 44B, a lower wall portion 44C, and left and right side wall portions 44D. As shown in FIG. 1, dimensional setting of the respective portions is carried out such that, in the state in which the module case 44 is accommodated in the concave portions 36 of the glove box door inner 26, the floor wall portion 44A of the module case 44 abuts central floor portions 35C of the lower ribs 35B, and the distal end portions of the upper wall portion 44B, the lower wall portion 44C and the left and right side wall portions 44D abut the glove box door outer general portion 24A.

Further, in the present embodiment, the respective distal end portions of the upper wall portion 44B, the lower wall portion 44C and the left and right side wall portions 44D of the module case 44 are heat-welded to the vehicle front side surface of the glove box door outer 24 (welded portions 50, refer to FIG. 1), and the floor wall portion 44A is heat-welded to the central floor portions 35C of the lower ribs 35B of the glove box door inner 26 (welded portions 52, see FIG. 1). Further, the distal end portions of the upper ribs 34 and the lower ribs 35 of the glove box door inner 26 are heat-welded to the vehicle front side surface of the glove box door outer 24 (heat-welded portions 54, see FIG. 1). Moreover, the glove box door inner peripheral wall portion 26B is heat-welded to the glove box door outer peripheral wall portion 24B (heat-welded portions 56, see FIG. 1).

Note that an unillustrated rotation shaft is provided at the lower edge side of the above-described glove box door 20, and the opening portion 18 of the glove box main body 16 is opened and closed with the center of rotation being this rotation shaft. Further, an unillustrated release knob is provided at the upper edge side of the above-described glove box door 20. Due to a passenger operating the release knob with his/her finger, the engaged state with an unillustrated lock mechanism provided at the opening portion 18 side of the glove box main body 16 is released, and the glove box door 20 rotates (opens) toward the vehicle cabin inner side around the lower end portion due to the urging force of an unillustrated urging means such as a spring or the like.

Operation and Effects of Present Embodiment

The operation and effects of the present embodiment are described next.

When the vehicle, in which the glove box door built-in-type knee airbag device of the above-described structure is installed, front-collides, the state thereof is sensed by an unillustrated collision sensing means, and a sensing signal is outputted to an airbag ECU. When airbag operation is decided by the airbag ECU, various types of airbag devices at the driver's seat side operate, and in addition, the glove box door built-in-type knee airbag device at the front passenger's seat side also operates. Namely, predetermined current is sent to the squib of the inflator 48 of the airbag module 42 that is built in the glove box door 20, and the inflator 48 is operated. Due thereto, gas is generated from the inflator 48, this gas is supplied into the knee airbag 46 that is housed within the glove box door 20 in a folded-up state, and the knee airbag 46 is inflated and expanded.

Because the distal end portion of the peripheral wall portion (the upper wall portion 44B and the lower wall portion 44C and the left and right side wall portions 44D) of the module case 44 is heat-welded to the vehicle front side surface of the glove box door outer 24, the inflation pressure of the knee airbag 46 works on the glove box door outer 24 without loss, and the glove box door outer general portion 24A is fractured rapidly along the fracture portion 28. Due thereto, as shown in FIG. 2, the airbag doors 30 expand upward and downward, and the knee airbag 46 is inflated and expanded between the glove box door 20 and the knees of the passenger so as to span between the upper portion 20A and the lower portion 20B of the glove box door 20, and the both knees of the passenger are restrained and protected by the knee airbag 46.

Here, in the glove box door built-in-type knee airbag device relating to the present embodiment, at the lower portion 20B of the glove box door 20, the airbag doors 30 are expanded so as to open both upward and downward, and the knee airbag 46 expands (see FIG. 2). Therefore, the load F2, that is applied to the lower portion 20B of the glove box door 20 via the knee airbag 46, is supported at the lower ribs 35 that are disposed at the vehicle front side of the airbag doors 30 after expansion. As a result, accompanying the expansion of the knee airbag 46, the rigidity of the lower portion 20B at the glove box door 20 decreases and the lower portion 20B becomes easy to deform.

Further, in the present embodiment, because the front-back direction thickness W2 of the lower portion 20B of the glove box door 20 is thin as compared with the front-back direction thickness W1 of the upper portion 20A, the rigidity of the lower portion 20B of the glove box door 20, with respect to the load F2 that is applied in the thickness direction of the glove box door 20 (the arrow W direction in FIG. 1) is low as compared with the rigidity of the upper portion 20A. Further, the plate thickness T2 of the lower ribs 35 that are provided at the lower portion 20B of the glove box door 20 are thin as compared with the plate thickness T1 of the upper ribs 34 that are provided at the upper portion 20A of the glove box door 20, and the rigidity of the lower ribs 35, with respect to the load applied in the thickness direction of the glove box door 20 (the arrow W direction in FIG. 1), is low as compared with the rigidity of the upper ribs 34.

Therefore, at the lower portion 20B of the glove box door 20, a relatively small reaction force that corresponds to the load F2 can be generated, and the knees 72 of a passenger of a small body build can be protected.

On the other hand, in the present embodiment, between the instrument panel reinforcement 74 and the upper portion 20A of the glove box door 20, the load transmitting bracket 80 is disposed at an incline from the vehicle lower rear side toward the vehicle upper front side, along the application direction of the load F1 (see FIG. 2) from the knees 70 of a passenger of a large body build. Therefore, via the knee airbag 46, the load F1 from the knees 70 of a passenger of a large body build that is applied to the upper portion 20A of the glove box door 20, is transmitted to the load transmitting bracket 80 with the concave portion 32 of the instrument panel lower 12 therebetween, and, via the load transmitting bracket 80, is transmitted to the instrument panel reinforcement 74.

Further, in the present embodiment, the front-back direction thickness W1 of the upper portion 20A of the glove box door 20 is thick as compared with the front-back direction thickness W2 of the lower portion 20B of the glove box door 20. Therefore, the rigidity of the upper portion 20A of the glove box door 20, with respect to the load F1 that is applied in the thickness direction of the glove box door 20 (the arrow W direction in FIG. 1) is high as compared with the rigidity of the lower portion 20B.

Further, in the present embodiment, the plate thickness T1 of the upper ribs 34 that are provided at the upper portion 20A of the glove box door 20 is thick as compared with the plate thickness T2 of the lower ribs 35 that are provided at the lower portion 20B of the glove box door 20, and the rigidity of the upper ribs 34, with respect to load applied in the thickness direction of the glove box door 20 (the arrow W direction in FIG. 1) is high as compared with the rigidity of the lower ribs 35.

Therefore, it is difficult for the upper portion 20A of the glove box door 20 to deform in the application direction of the load F1, and, at the upper portion 20A of the glove box door 20, a relatively large reaction force that corresponds to the load F1 can be generated. As a result, at the upper portion 20A of the glove box door 20, the knees 70 of a passenger of a large body build can be protected reliably.

Accordingly, in the present embodiment, reaction force that corresponds to the body build of the passenger can be generated at the glove box door 20. Namely, an energy absorbing effect that corresponds to the body build of the passenger is obtained.

In the above, the present invention is described in detail with reference to a specific embodiment, but the present invention is not limited to the above-described embodiment, and it will be clear to those skilled in the art that various other embodiments are possible within the scope of the present invention. For example, in the above-described embodiment, the load transmitting bracket 80 is provided between the instrument panel reinforcement 74 and the upper portion 20A of the glove box door 20, but instead, there may be a structure in which there is no load transmitting bracket 80. In this case, the load F1, that is applied from the knee airbag 46 to the upper portion 20A of the glove box door 20, is transmitted to and supported at the instrument panel 10 via the glove box main body 16. Therefore, even if there is a structure in which there is no load transmitting bracket 80, reaction force that corresponds to the body build of the passenger can be generated at the glove box door 20. Namely, an energy absorbing effect that corresponds to the body build of the passenger is obtained.

Further, in the above-described embodiment, the upper ribs 34 and the lower ribs 35 are set only at the glove box door inner 26 side, but are not limited to the same, and the upper ribs 34 and the lower ribs 35 may be set at a region that is outside of the range at which the module case is mounted at the glove box door outer, or the upper ribs 34 and the lower ribs 35 may be provided so as to be distributed at both the glove box door inner and the glove box door outer.

Further, in the above-described embodiment, the upper ribs 34 and the lower ribs 35 are structured as lateral ribs whose longitudinal directions are the vehicle transverse direction, but are not limited to the same, and the upper ribs 34 and the lower ribs 35 may be ribs that extend along the thickness direction of the glove box door 20, or may be structured only by vertical ribs whose longitudinal directions are the vehicle vertical direction, or lateral ribs and vertical ribs may be combined so as to set ribs of a lattice shape for example, or the like.

Second Embodiment

A second embodiment of the knee airbag device for a vehicle relating to the present invention is described next by using FIG. 6 through FIG. 9.

Figure 6:
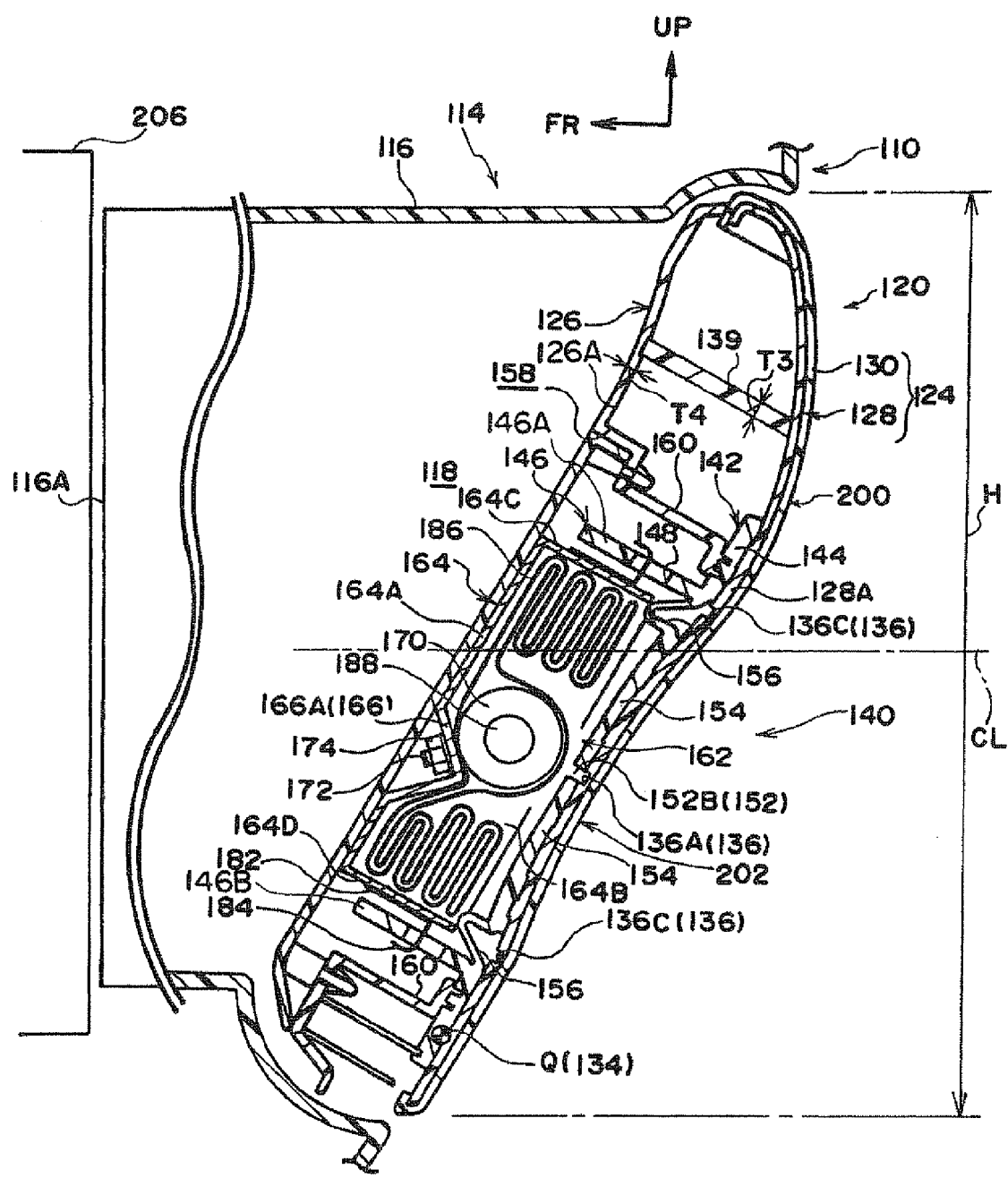
FIG. 6 is an enlarged vertical sectional view of main portions of a glove box door built-in-type knee airbag device relating to a second embodiment.
Figure 7:
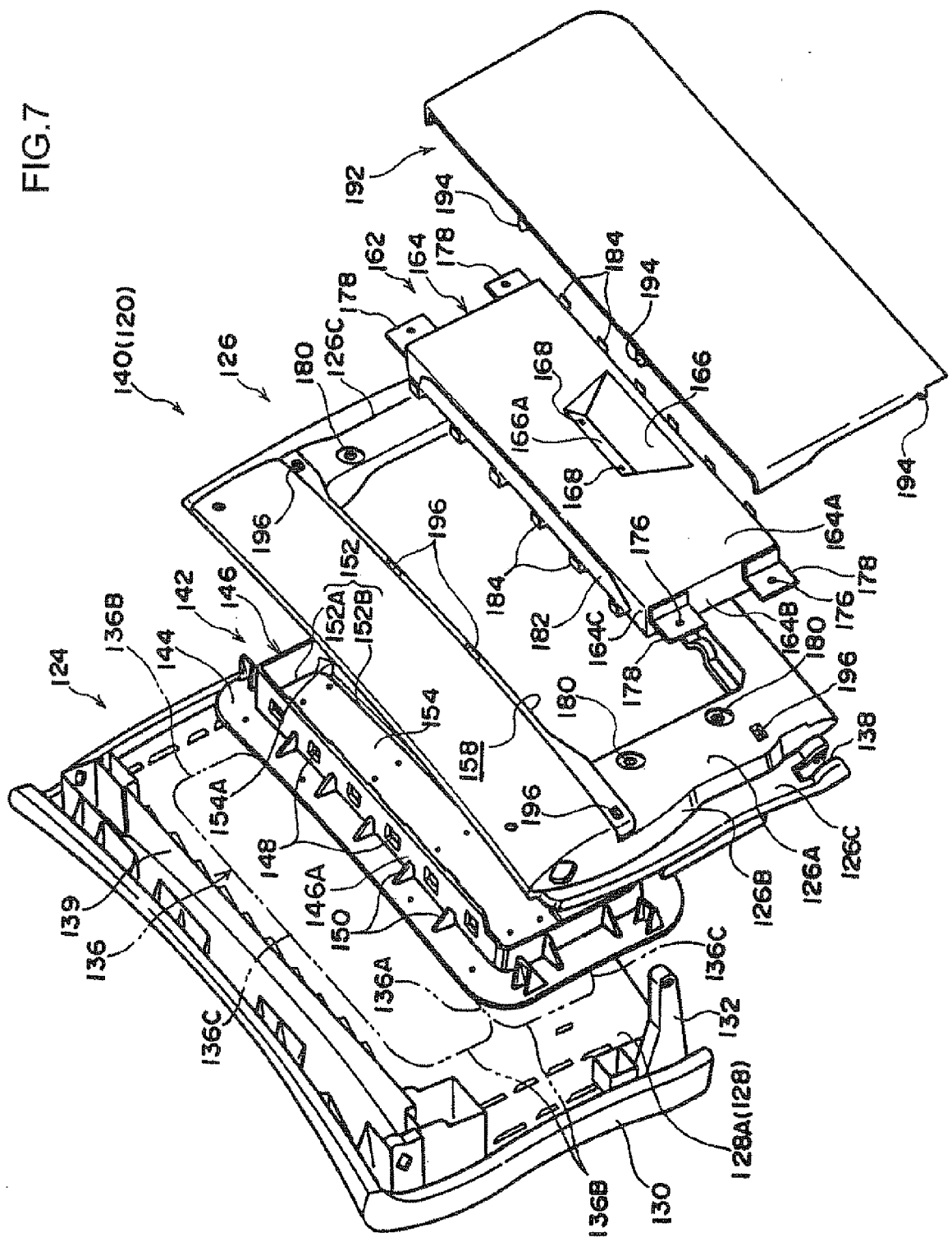
FIG. 7 is an exploded perspective view of a glove box door shown in FIG. 6.
Figure 8:
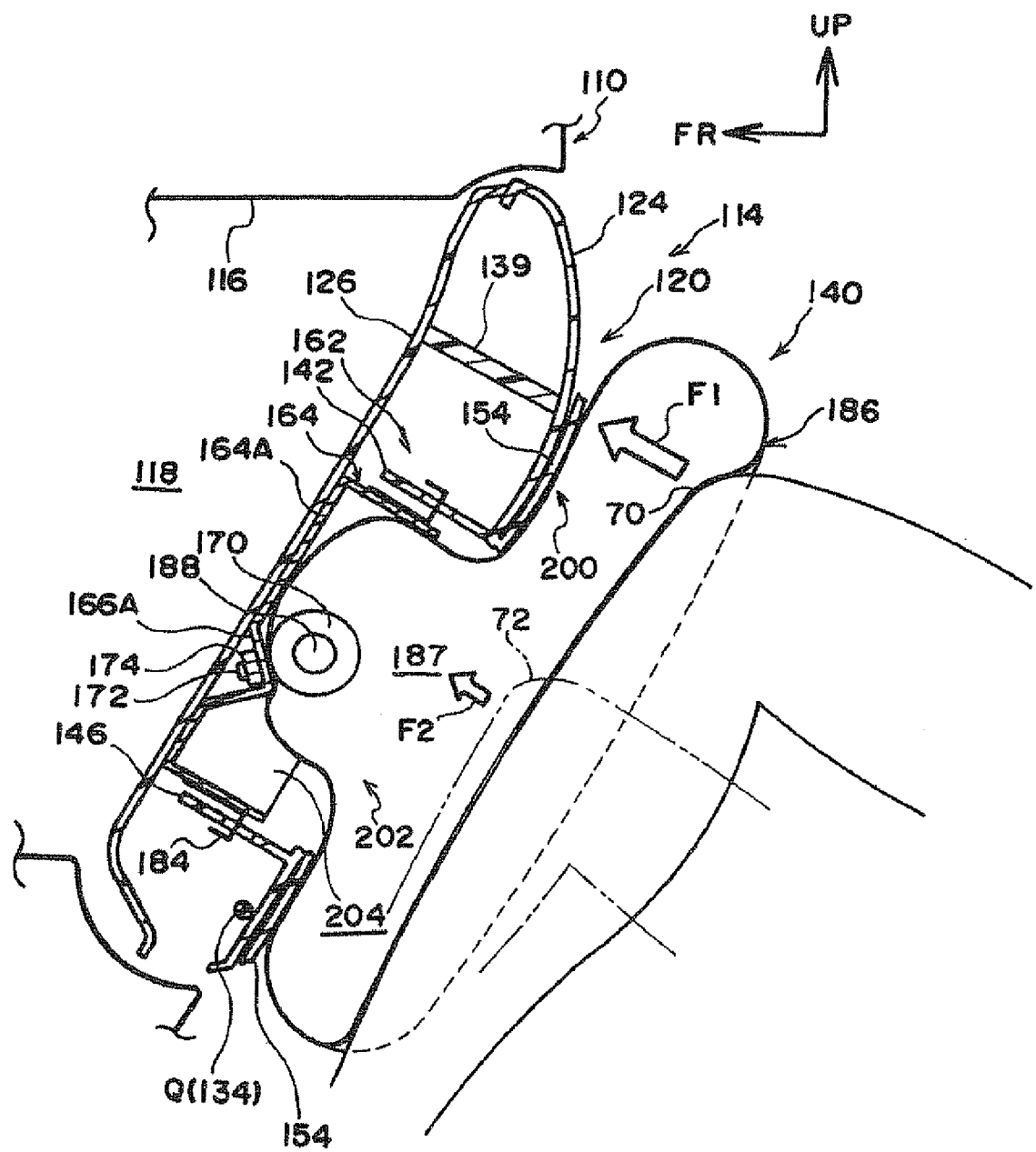
FIG. 8 is a schematic vertical sectional view showing a state in which a knee airbag is inflated and expanded when a passenger of a large body build is seated.
Figure 9:
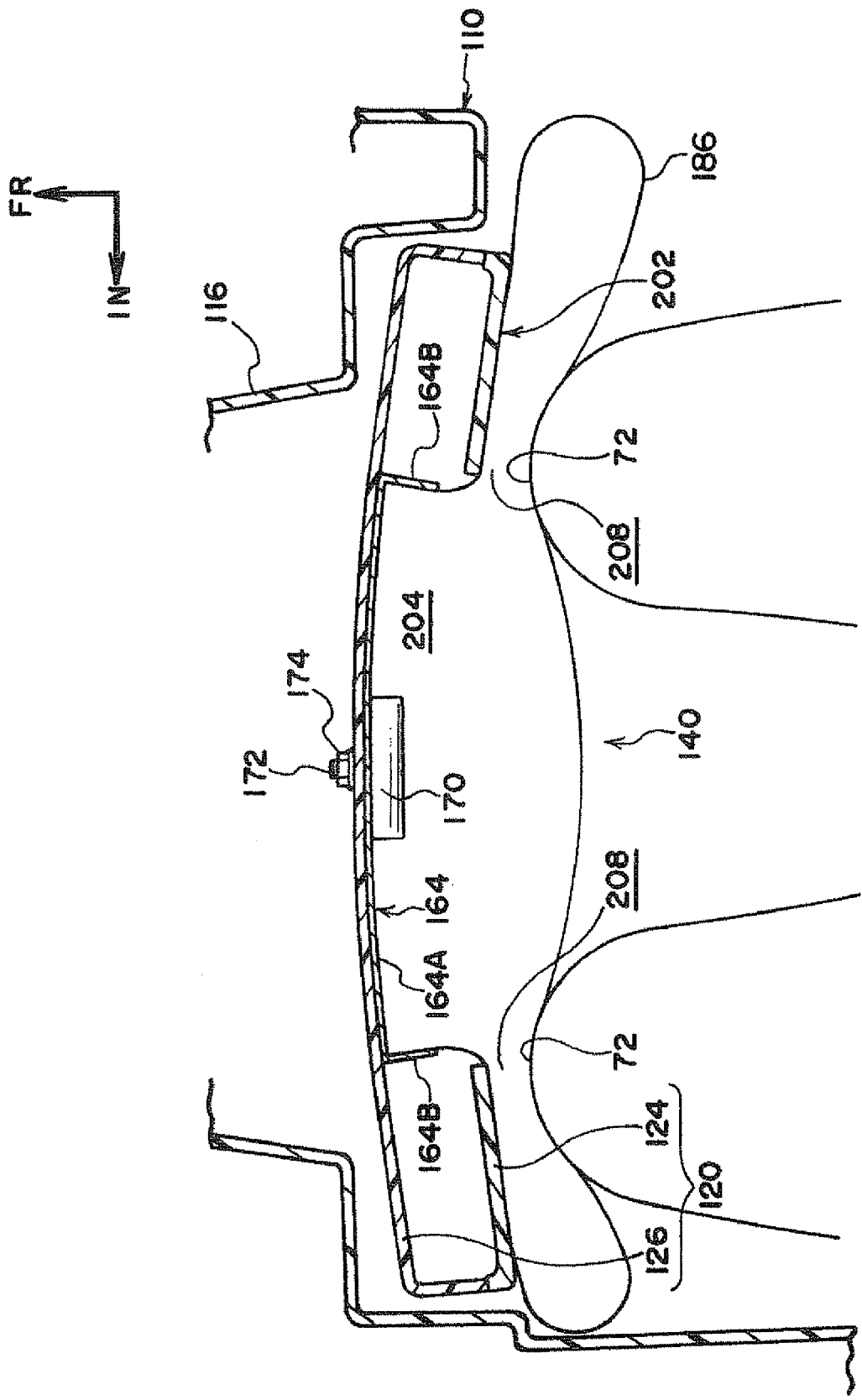
FIG. 9 is a schematic plan sectional view showing a state in which the knee airbag is inflated and expanded when a passenger of a small body build is seated.

An enlarged vertical sectional view of main portions of a glove box door built-in-type knee airbag device at a time of non-operation is shown in FIG. 6. Further, an exploded perspective view of that glove box door is shown in FIG. 7. Moreover, a schematic vertical sectional view at the time when a knee airbag is expanded in a case in which a passenger of a large body build is seated is shown in FIG. 8. Further, a schematic plan sectional view at the time when the knee airbag is expanded in a case in which a passenger of a small body build is seated is shown in FIG. 9.

A glove box 114 for placing small items is disposed at a position substantially opposing the knees of a passenger at the front passenger's seat side of an instrument panel 110. As shown in FIG. 6, the glove box 114 is structured by a glove box main body 116 that serves as a main body portion and is made of resin and is formed in the shape of a box, and a glove box door 120 that opens and closes an opening portion 118 of the glove box main body 116. The glove box main body 116 is disposed such that the opening portion 118 faces the vehicle rear side (the vehicle cabin inner side).

As shown in FIG. 6 and FIG. 7, a glove box door built-in-type knee airbag device 140 is built in the glove box door 120 that closes the opening portion 118 of the above-described glove box main body 116. The glove box door 120 has a glove box door outer 124 that (serves as an interior panel member and) is rectangular panel shaped and is disposed at the vehicle cabin inner side and forms the design surface, and a glove box door inner 126 that is substantially rectangular frame shaped and is disposed at the vehicle front side of the glove box door outer 124 and is covered on the glove box door outer 124. The glove box door outer 124 and the glove box door inner 126 are both made of resin.

The glove box door outer 124 is structured as a two-layer structure of a base member 128 that is formed in a substantially rectangular panel shape, and a surface skin 130 that covers the vehicle cabin inner side surface of the base member 128. Both the base member 128 and the surface skin 130 are made of resin, but the surface skin 130 is structured of a resin material that is softer than the base member 128. A pair of left and right stoppers 132 stand at the both sides of the lower edge side of the base member 128. Each of the stoppers 132 extends from a general portion 128A of the base member 128 toward a surface orthogonal direction (the vehicle front side), and, when the glove box door 120 is in a fully open state, the distal end portions interfere with wall surfaces of the glove box main body 116, and the stoppers 132 perform the function of holding the glove box door 120 at the fully open position.

A hinge 134, that is formed in a substantial L-shape in side view, is provided at the inner side of the stopper 132. One end portion of the hinge 134 is fixed by a screw or the like to the glove box main body 116. When the glove box door 120 is opened and closed, the glove box door 120 rotates around rotation center Q of FIG. 6.

Further, as shown in FIG. 6, a substantially H-shaped tear portion 136, that is fractured (ruptured) when bag inflation pressure of a predetermined value or greater is applied via an airbag door retainer 142 that is described later, is set at the vehicle cabin outer side surface (the glove box door inner 126 side surface) at the general portion 128A of the glove box door outer 124. The tear portion 136 is structured by a horizontal direction central tear portion 136A that extends along the vehicle transverse direction at the vehicle vertical direction intermediate portion of a general portion 128A, a pair of left and right vertical direction tear portions 136B that extend in the vehicle vertical direction from the both end portions of the horizontal direction central tear portion 136A, and horizontal direction upper/lower tear portions 136C that connect the distal end portions of these vertical direction tear portions 136B with one another.

On the other hand, the glove box door inner 126 is structured to include a floor wall portion 126A that is rectangular frame shaped and faces the general portion 128A of the base member 128 of the glove box door outer 124, a pair of left and right side wall portions 126B that are formed integrally with the both side portions in the vehicle transverse direction of the floor wall portion 126A, and a pair of left and right overhang portions 126C that jut-out from the glove box door outer 124 side end portions of the pair of left and right side wall portions 126B toward the vehicle transverse direction outer sides. Cut-outs 138 are formed in the bottom edge sides of the overhang portions 126C at positions facing the stoppers 132 of the glove box door outer 124. The stoppers 132 are inserted within the cut-outs 138.

The glove box door outer 124 and the glove box door inner 126 of the above-described structure are joined together via vertical direction, lateral direction ribs 139 (see FIG. 6) that are formed at least one of the both. Concretely, the glove box door outer 124 and the glove box door inner 126 are vibration welded at the distal end portions of the ribs 139, but fastening by a fastener may be utilized, or vibration welding and fastening may be used in combination, and it suffices for them to be a structure that can make the glove box door outer 124 and the glove box door inner 126 integral.

As shown in FIG. 6 and FIG. 7, the airbag door retainer 142, that is made of resin and formed in a substantially rectangular flat plate shape, is disposed between the above-described glove box door outer 124 and glove box door inner 126. The airbag door retainer 142 has a base portion 144 that is formed in a rectangular flat plate shape, and a longitudinal wall portion 146 that is rectangular frame shaped and stands from a vicinity of the outer peripheral portion of the base portion 144. Plural anchor holes 148, that are each structured as a rectangular opening, are formed at predetermined intervals in a longitudinal wall upper portion 146A and a longitudinal wall lower portion 146B, that are positioned at the vehicle vertical direction sides, of the longitudinal wall portion 146. Note that plural ribs 150 for reinforcement that are formed in right-triangular shapes in side view are disposed so as to span and stand between a region in the vicinity of the outer peripheral portion of the base portion 144 and the longitudinal wall upper portion 146A, the longitudinal wall lower portion 146B.

Further, a groove 152, that is substantially H-shaped in front view and is formed from a pair of left and right vertical grooves 152A and a lateral groove 152B that connects these vertical grooves 152A, is formed in the central portion (the portion surrounded by the longitudinal wall portion 146) of the base portion 144 of the airbag door retainer 142. Due to this groove 152 being formed, a pair of upper and lower airbag doors 154, that are substantially H shaped in front view, are formed in the base portion 144 of the airbag door retainer 142. Note that corner portions 154A at the lateral groove 152B side of each of the airbag doors 154 are formed in arc shapes. Further, slack portions 156 (see FIG. 6), that are formed in substantial V shapes in side view, are formed at the rotation center sides of the respective airbag doors 154. Due to these slack portions 156 being extended at the time when the airbag doors 154 expand, the airbag doors 154 expand smoothly.

As shown in FIG. 6, a pair of upper and lower ribs 160, that extend-out toward the airbag door retainer 142, are formed integrally at the upper edge side and the lower edge side of a central opening portion 158 that is in the floor wall portion 126A of the above-described glove box door inner 126. In the assembled state of the glove box door 120, these ribs 160 stand in parallel at the outer sides of the longitudinal wall upper portion 146A and the longitudinal wall lower portion 146B of the longitudinal wall portion 146 of the airbag door retainer 142, and the respective distal end portions are welded (vibration welded) to the base portion 144 of the airbag door retainer 142. Due thereto, the base portion 144 of the airbag door retainer 142 is fixed in a state of being nipped between the general portion 128A of the base member 128 of the glove box door outer 24 and the ribs 160 of the glove box door inner 126.

Further, as shown in FIG. 6 and FIG. 7, an airbag module 162 is mounted in the central opening portion 158 of the glove box door inner 126. The airbag module 162 has a module case 164 made of metal. The module case 164 forms a box shape whose floor is shallow. An inflator fixing portion 166, that swells-out from the vehicle front side toward the vehicle rear side by being knocked-out in an isosceles trapezoid shape, is provided at the central lower portion of a floor wall portion 164A of the module case 164. The longitudinal sectional shape of the inflator fixing portion 166 is mountain shaped. A pair of left and right bolt insert-through holes 168 are formed in an inclined portion 166A at the vehicle upper side at the inflator fixing portion 166. Due to a pair of stud bolts 172 (see FIG. 6), that project-out from the axial direction intermediate portion toward the radial direction outer side of an inflator 170, being inserted-in these bolt insert-through holes 168 and nuts 174 being screwed-together from the reverse surface side, the inflator 170 is fastened and fixed to the inclined portion 166A of the inflator fixing portion 166.

Further, mounting pieces 178, that are L-shaped and in whose central portions are formed screw insert-through holes 176, are respectively mounted to a total of four places at left and right side wall portions 164B of the module case 164. In correspondence therewith, screw insert-through holes 180 are formed on the same axes as the screw insert-through holes 176, at the both sides of central opening portion 158 of the glove box door inner 126. Then, by making the bolt insert-through holes 176 of the respective mounting pieces 178 correspond to the screw insert-through holes 180 of the glove box door inner 126 side, and by fastening and fixing by unillustrated fasteners such as screws or the like, the module case 164 is fixed to the central opening portion 158 of the glove box door inner 126 from the vehicle front side.

Further, elongated anchor hardware 182 are mounted to an upper wall portion 164C and a lower wall portion 164D of the module case 164, respectively. Anchor pieces 184, that are formed in L shapes in side view, are formed at a predetermined interval and integrally with one side (the airbag door retainer 142 side) of the anchor hardware 182. The plural anchor pieces 184 are provided in correspondence with the above-described anchor holes 148 that are formed in the longitudinal wall upper portion 146A and the longitudinal wall lower portion 146B of the airbag door retainer 142. Then, by inserting the respective anchor pieces 184 into and anchoring them with the respective anchor holes 148, the airbag door retainer 142 is mounted to the module case 164.

As shown in FIG. 6, the inflator 170 (that serves as a gas generating means), and a knee airbag 186 that inflates due to gas jetted-out from the inflator 170, are assembled within the above-described module case 164. The inflator 170 is formed in a solid cylindrical shape of an outer diameter that can be contained in the module case 164. Further, a gas jet-out portion 188 is formed on the same axis, at one end portion in the axial direction of the inflator 170. Moreover, the outer diameter of the gas jet-out portion 188 is shorter than the outer diameter of the inflator 170, and plural gas jet-out holes (not illustrated) are formed in the peripheral wall portion of the gas jet-out portion 188.

On the other hand, the knee airbag 186 is accommodated within the module case 164 in a folded-up state. More concretely, the knee airbag 186 is folded-up to a size that can be accommodated in the module case 164 due to the upper portion and the lower portion of the knee airbag 186 that is in a planar expanded state respectively being folded in the form of bellows and being set toward the central portion. Then, the above-described inflator 170 is inserted in the central portion (the height direction intermediate portion) of the knee airbag 186, and the stud bolts 172 that project-out from the inflator 170 are passed-through the knee airbag 186, and are fixed to the inflator fixing portion 166 of the module case 164 in the above-described manner. Accordingly, the knee airbag 186 is assembled in a state of being nipped between the inflator 170 and the inflator fixing portion 166. Further, the region in the vicinity of the rear of the region where the inflator 170 is disposed at the knee airbag 186 is a gas flow-in portion 187 (see FIG. 8).

Further, the central opening portion 158 of the glove box door inner 126 is, after assembly of the airbag module 162, closed by a reverse surface cover 192 that is made of resin and formed in a rectangular plate shape. Plural leg portions 194 are formed integrally from the four sides of the reverse surface cover 192 toward the glove box door inner 126 side. A claw is formed at the distal end portion of each of the leg portions 194. In correspondence therewith, plural rectangular insert holes 196 are formed at the outer peripheral portion of the central opening portion 158 at the floor wall portion 126A of the glove box door inner 126. Then, by inserting the leg portions 194 into the insert holes 196 and elastically engaging them, the reverse surface cover 192 is mounted to the vehicle front side surface of the glove box door inner 126.

Main portions of the present embodiment are described next. As shown in FIG. 6, the airbag module 162 is accommodated within the glove box door 120 at a position that is offset toward the vehicle lower side with respect to the central position CL (a position at ½ of the height H of the glove box door 20) in the door height direction (the vehicle vertical direction) of the glove box door 120.

Further, a plate thickness T3 of the ribs 139, that are disposed at an upper portion 200 within the above-described glove box door 120, is set to be sufficiently thicker than a plate thickness T4 of the floor wall portion 126A of the glove box door inner 126. By the way, in the present embodiment, the plate thickness T3 of the ribs 139 is set to be the same thickness as the plate thickness T1 of the upper ribs 34 described in the first embodiment. However, the plate thickness T3 of the ribs 139 may be set to be thicker than the plate thickness T1 of the upper ribs 34, or a plurality of the ribs 139 may be provided so as to stand adjacently as in the first embodiment.

In accordance with the above-described structure, the rigidity of the glove box door 120 at a lower portion 202 is set to be lower than at the upper portion 200 (conversely, the rigidity of the upper portion 200 is higher than the lower portion 202). To supplement description of this point, when the knee airbag device 140 operates and the knee airbag 186 is inflated and expanded, the surface skin 130 of the glove box door outer 124 ruptures along the tear portion 136, and, due to the airbag doors 154 being expanded upward and downward and a cavity portion 204 (see FIG. 8, FIG. 9) being formed at the place where the knee airbag 186 was accommodated within the lower portion 202 of the glove box door 120, the rigidity of the lower portion 202 of the glove box door 120 becomes lower than the rigidity of the upper portion 200 in the state after expansion of the knee airbag 186. In addition thereto, due to the above-described ribs 139 being set, the rigidity of the upper portion 200 is made to be an even higher rigidity, and the disparity of the rigidity difference with the lower portion 202 becomes larger by that much.

Further, an air conditioning unit 206 (see FIG. 6) serving as a vehicle equipment part is disposed at the vehicle front side of the above-described glove box 114. The air conditioning unit 206 is a rigid body, and is supported at the instrument panel reinforcement 74 (see FIG. 1 and FIG. 4 of the first embodiment).

Operation and Effects of Present Embodiment

The operation and effects of the present embodiment are described next.

When the vehicle, in which the glove box door built-in-type knee airbag device 140 of the above-described structure is installed, front-collides, the state thereof is sensed by an unillustrated collision sensing means, and a sensing signal is outputted to an airbag ECU. When airbag operation is decided by the airbag ECU, various types of airbag devices at the driver's seat side operate, and in addition, the glove box door built-in-type knee airbag device 140 at the front passenger's seat side also operates. Namely, predetermined current is sent to the squib of the inflator 170 of the airbag module 162 that is built in the glove box door 120, and the inflator 170 is operated. Due thereto, gas is generated from the inflator 170, this gas is supplied into the knee airbag 186 that is housed within the glove box door 120 in a folded-up state, and this is inflated.

The knee airbag 186 in a folded-up state inflates, and, when the bag inflation pressure that is applied to the tear portion 136 via the airbag door retainer 142 reaches a predetermined value, as shown in FIG. 8, the tear portion 136 fractures (ruptures), and the pair of airbag doors 154 are expanded upward and downward. Due thereto, the knee airbag 186 is inflated and expanded in the gap between the knees 70 of the passenger and the glove box door 120 (an instrument panel 100). As a result, the knees 70 of that passenger are restrained and protected by the knee airbag 186.

Here, as shown in FIG. 8, when a passenger of a large body build is seated in the seat, the knees 70 of that passenger face the upper portion 200 of the glove box door 120, and, when the vehicle collides, a relatively large load (arrow F1) is applied to the upper portion 200 of the glove box door 120 via the knee airbag 186.

However, in the present embodiment, the airbag module 162 is accommodated within the glove box door 120 at a position that is offset, toward the vehicle lower side, with respect to the central position CL in the door height direction of the glove box door 120, and therefore, even when the knee airbag 186 inflates and expands, within the upper portion 200, the cavity portion 204 is not formed and, on the contrary, the ribs 139 whose plate thickness is set to be thick exist. Namely, the rigidity of the upper portion 200 of the glove box door 120 is higher than the rigidity of the lower portion 202. Therefore, load, that is inputted from the knees 70 of a passenger of a large body build, is received at the glove box main body 116 via the ribs 139. Thereafter, a front wall portion 116A of the glove box main body 116 interferes with the air conditioning unit 206 disposed at the front thereof, and, here, a relatively large reaction force arises. Due thereto, incursion of the knees 70 of that passenger toward the instrument panel 110 side is repressed, and the knees 70 are restrained and protected.

On the other hand, when a passenger of a small body build is seated in the seat, the knees 72 of that passenger face the lower portion 202 of the glove box door 120, and, when the vehicle collides, a relatively small load (arrow F2) is applied to the lower portion 202 of the glove box door 120 via the knee airbag 186.

However, in the present embodiment, because the airbag module 162 is accommodated within the glove box door 120 at a position that is offset toward the vehicle lower side with respect to the central position CL in the door height direction of the glove box door 120, when the knee airbag 186 inflates and expands, the cavity portion 204 is formed at the interior of the lower portion 202. Due thereto, the substantial thickness of the glove box door 120 becomes thin, and there is no member that supports the glove box door inner 126 from the back (i.e., the vehicle front side) of the cavity portion 204, and therefore, the rigidity of the lower portion 202 becomes sufficiently lower than the rigidity of the upper portion 200. Due thereto, at the lower portion 202 side of the glove box door 120, reaction force, that is relatively large and that corresponds to that small load, is obtained.

Due to the above, in accordance with the present embodiment, reaction force that corresponds to the body build of the passenger can be generated at the glove box door 120. As a result, both the knees 70 of a passenger of a large body build and the knees 72 of a passenger of a small body build are restrained appropriately at the knee airbag 186, and the knees 70, 72 can be protected from the collision load at the time of a front collision.

In other words, the present embodiment can be called the idea that, focusing on the intrinsic operation of the knee airbag device 140, if the knee airbag 186 is inflated and expanded, the cavity portion 204 is formed and the rigidity decreases at the portion where the knee airbag 186 was folded-up and accommodated, and therefore, that decreased rigidity portion is made to match the height of the knees 72 of a passenger of a small body build.

Further, by structuring the device in this way, at usual times, the knee airbag 186 is folded-up and accommodated at a position that is offset toward the vehicle lower side with respect to the central position CL in the door height direction of the glove box door 120, and therefore, the rigidity required of the glove box door 120 overall is maintained.

In addition, because the rigidity of the lower portion 202 of the glove box door 120 is set to be lower than the rigidity of the upper portion 200, when a passenger of a small body build is seated in the seat, the knees 72 of that passenger can be restrained and protected more rapidly and reliably. This is described hereinafter by using FIG. 9. The situation when the knee airbag device 140 operates and the knee airbag 186 inflates and expands in a case in which a passenger of a small body build is seated in the seat is drawn in a plan view in FIG. 9. As shown in this figure, due to the knee airbag 186 inflating and expanding, the cavity portion 204 is formed at the lower portion 202 of the glove box door 120, and, at the vehicle front side of the glove box door inner 126, there is no member that supports the lower portion of the glove box door inner 126, and therefore, the lower portion 202 of the glove box door 120 flexes easily as compared with the upper portion 200. Thus, when the knees 72 of a passenger of a small body build push the lower portion 202 of the glove box door 120 toward the vehicle front side via the knee airbag 186, or in other words, when the inflation reaction force of the knee airbag 186 is applied to the lower portion 202 of the glove box door 120, the vehicle front side deforms in a curved shape that is convex, when seen in plan view. As a result, gaps 208 between the knees 72 of the passenger and the glove box door outer 124 of the glove box door 120 are enlarged in the vehicle longitudinal direction, and both end portions 186A of the knee airbag 186 are inflated and expanded rapidly in the vehicle transverse direction. Accordingly, in accordance with the present embodiment, when a passenger of a small body build is seated in the seat, the knees 72 of that passenger can be restrained and protected rapidly and appropriately.

Further, in the present embodiment, the accommodating position of the airbag module 162 with respect to the glove box door 120 is disposed so as to be offset toward the vehicle lower side, and the plate thickness of the ribs that were originally provided is made to be thick and the ribs 139 are merely provided, and therefore, newly-provided parts, such as the load transmitting bracket 80 or the like, are not needed as in the first embodiment. Moreover, the air conditioning unit 206 as well is a vehicle equipment part that was originally provided. Therefore, the needed reaction force can be obtained in accordance with the body build of the passenger, at a low cost and without increasing the number of parts at all.

Note that, in the above-described present embodiment, the air conditioning unit 206 is disposed adjacent at the vehicle front side of the glove box main body 116, but the present invention is not limited to the same, and it suffices for the glove box main body 116 to be supported directly or via a bracket at the vehicle body side. Because an example is illustrated in FIG. 1 that was used in the first embodiment, to describe by using FIG. 1, there may be a structure in which a proximal end portion 210A of a bracket 210 is fixed by welding or the like to the instrument panel reinforcement 74, and a distal end portion 210B is fixed by screws 212 or the like to the glove box main body 16.

In accordance with this structure, the structure can be established also when a vehicle equipment part such as the air conditioning unit 206 or the like does not exist. As a result, a reaction force that corresponds to the body build of the passenger can be generated at the glove box door 120 also when a member that is just right for obtaining reaction force does not exist at the vehicle front side of the glove box 114.

Third Embodiment

A third embodiment of the knee airbag device for a vehicle relating to the present invention is described next by using FIG. 10 and FIG. 11.

Figure 10:
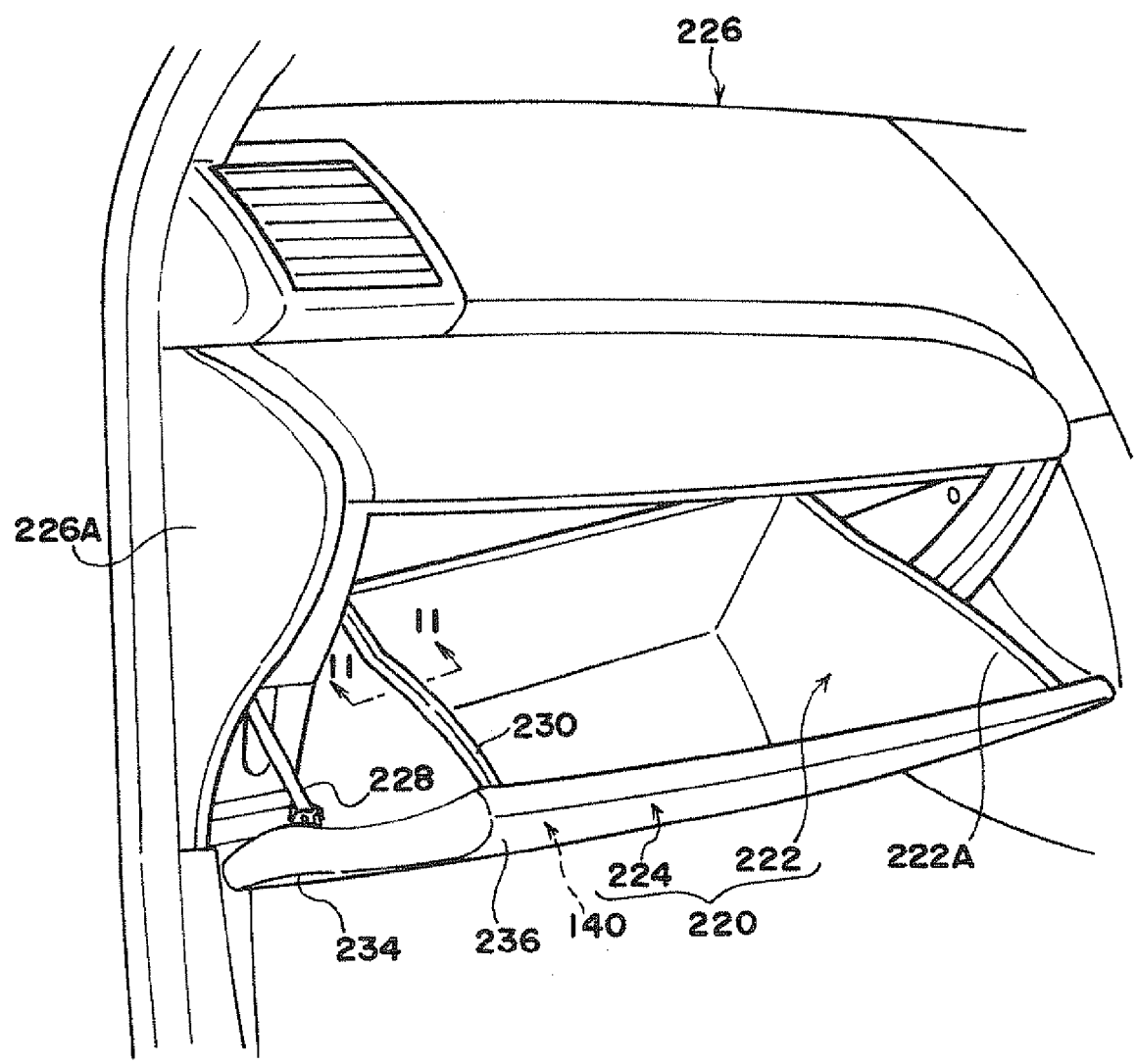
FIG. 10 is a perspective view showing an open state of a bin-type glove box door, relating to a third embodiment.

As shown in FIG. 10, this embodiment has a feature in the point that the present invention is applied to a glove box 220 of a different type than the above-described first embodiment and second embodiment.

Concretely, in this glove box 220, the upper surface side of a glove box main body 222 is open, and a glove box door 224 is provided integrally with the vehicle cabin inner side surface of the glove box main body 222. Note that a damper 228, for improving the operational feeling at times of opening and closing the glove box, is disposed between the outer peripheral portion of a vehicle transverse direction outer side of the glove box door 224 and a vehicle transverse direction outer side end portion 226A of an instrument panel 226.

The knee airbag device 140 described in the second embodiment is built in the above-described glove box door 224. Moreover, in this embodiment, a flange-shaped reinforcing portion 230 is formed integrally with an upper end portion 222A of the glove box main body 222. To describe in detail, the upper end portion 222A of the glove box main body 222 is formed by side walls at the vehicle transverse direction both sides and a front wall at the vehicle front. The flange-shaped reinforcing portion 230 is formed over the entire periphery of this upper end portion 222A.

Figure 11:
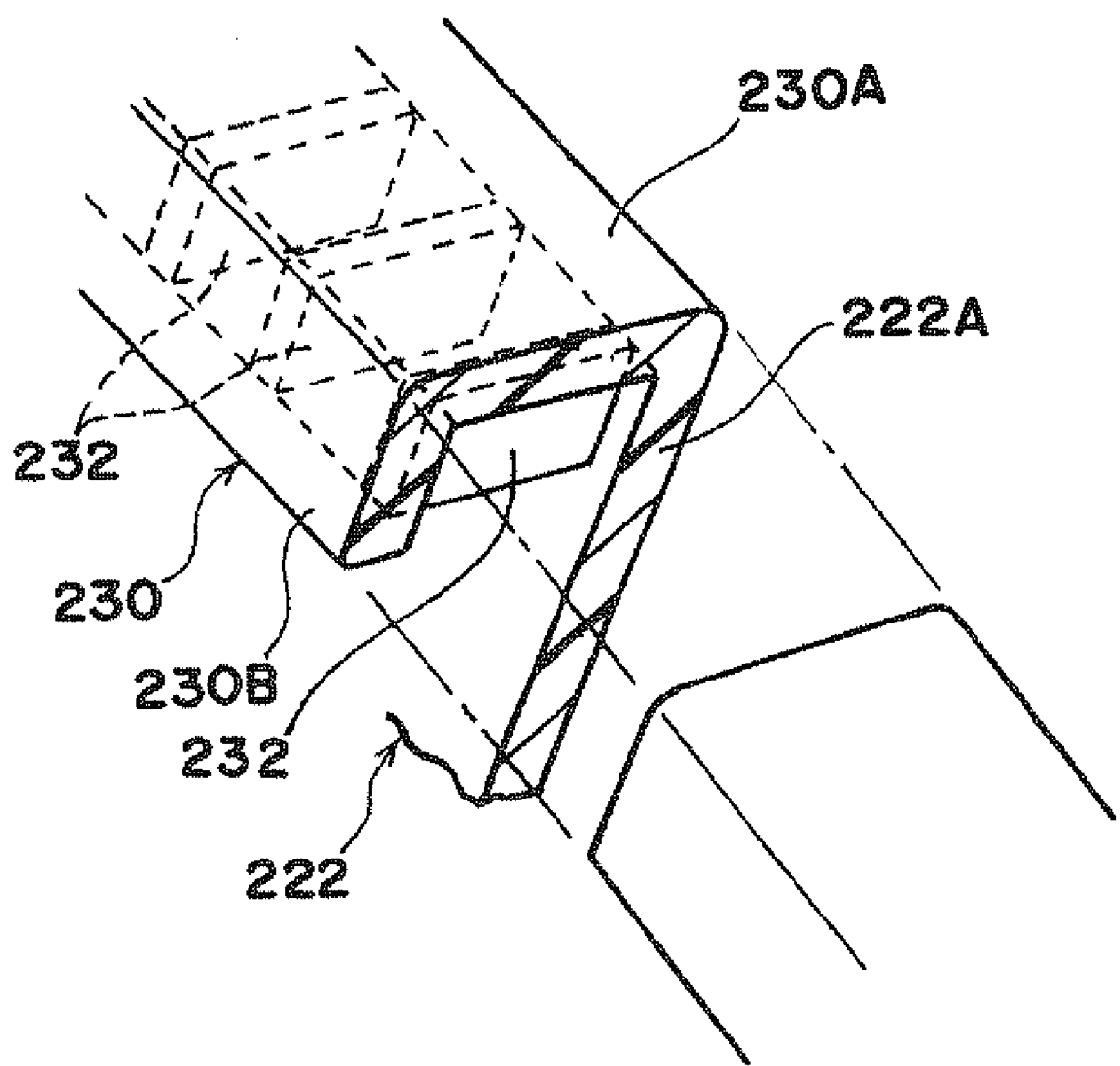
FIG. 11 is an enlarged perspective view of main portions shown as being partially cut along line 11-11 of FIG. 10.

An enlarged perspective view, in which a portion of the reinforcing portion 230 is drawn as being broken, is shown in FIG. 11. As shown in this figure, the reinforcing portion 230 is structured by being extended-out by a predetermined width toward the outer side of the glove box main body 222 from the upper end portion 222A of the glove box main body 222, and thereafter, being bent at a right angle toward the lower side of the glove box main body 222, and the cross-sectional shape thereof is L-shaped.

Moreover, ribs 232 stand at a predetermined interval within the reinforcing portion 230. The ribs 232 are connected to three surfaces that are the upper end portion 222A of the glove box main body 222 and a top wall portion 230A and a side wall portion 230B of the reinforcing portion 230.

Operation and Effects of Present Embodiment

The operation and effects of the present embodiment are described next.

In accordance with the above-described structure, because the knee airbag device 140 that was described in the second embodiment is built within the glove box door 224, the rigidity of a lower portion 234 of the glove box door 224 is set to be lower than the rigidity of an upper portion 236. Accordingly, the operation and effects that were described in the above-described second embodiment are similarly obtained.

In addition, in the case of this embodiment, because the upper surface side of the glove box main body 222 is open, when attention is focused only on the glove box main body 222, the rigidity of the upper portion of the glove box main body 222 is lower than the rigidity of the lower portion. Accordingly, in a case in which the reinforcing portion 230 of the present embodiment is not provided at the upper end portion of the glove box main body, even if the rigidity of the upper portion 236 of the glove box door 224 is higher than the rigidity of the lower portion 234, a sufficient reaction force cannot be generated at times of inflation and expansion of the knee airbag 186.

However, in accordance with the present embodiment, because the reinforcing portion 230 is formed at the upper end portion 222A of the glove box main body 222, rigidity of the upper end portion 222A of the glove box main body 222 is sufficiently ensured. As a result, even with respect to the glove box 220 whose upper surface side is open, a reaction force that is sufficient to receive and restrain and protect the knees 70 of a passenger of a large body build via the knee airbag 186 is obtained.

Note that, in the above-described embodiment, the reinforcing portion 230 is formed at the entire periphery of the upper end portion 222A of the glove box main body 222, but is not limited to the same, and may be provided at a portion thereof. For example, because the loads F1, F2 (see FIG. 8 of the second embodiment) from the knees 70, 72 of passengers are inputted toward the vehicle front side, the reinforcing portion may be provided at only the both side portions of the upper end portion 222A of the glove box main body 222.

Further, in the above-described embodiment, although the reinforcing portion 230 whose cross-sectional configuration is formed in an L shape is provided, the structure of the reinforcing portion is not limited to this, and may be another structure. For example, because reinforcing the ridgeline of the upper end portion 222A of the glove box main body 222 is effective in increasing the rigidity, a technique may be used of making the plate thickness of only the upper end portion 222A thick or making the cross-sectional configuration be a solid circle.

Supplementary Description of the Above-Described Embodiments (1) In the above-described embodiments, it is described that the glove box door built-in-type knee airbag device operates at the time of a front collision, but the present invention is not limited to this, and a collision predicting means such as a pre-crash sensor or the like may be installed in the vehicle, and the glove box door built-in-type knee airbag device may be operated when it is predicted that the vehicle will collide by the collision predicting means.

(2) To further explain the term "built-in" in the case of the glove box door built-in-type knee airbag device relating to the above-described embodiments, not all of the principal structural elements of the knee airbag device must be disposed within the glove box door 20, 120, 224, and the device is encompassed within "built-in" if at least the knee airbag 46, 186 is disposed within the glove box door 20, 120, 224. Accordingly, as described above, the inflator and the knee airbag may be communicated by a communicating means such as a hose or the like, and then the inflator may be provided at the glove box main body 16, 116, 116 side, or may be provided at the instrument panel 10, 110, 226 side, or may be provided at a body such as the instrument panel reinforcement or the like, or may be provided at an equipment device such as the air conditioning unit or the like.

The invention claimed is:

1. A knee airbag device for a vehicle comprising:
a knee airbag that, due to gas being supplied, inflates and is expanded toward a vehicle rear side;
a glove box door that is provided so as to be able to open and close a glove box, and in which the knee airbag is accommodated in a folded-up state, and further, at which a rigidity of a lower portion of the glove box door is set to be lower than a rigidity of an upper portion thereof;
an upper rib that is formed at a position that is upper than an airbag module that is structured to include the knee airbag is accommodated within the glove box door; and
a lower rib that is formed at a position that is lower than the airbag module.

2. The knee airbag device for a vehicle of claim 1, wherein the airbag module is accommodated within the glove box door at a position that is offset, toward a vehicle lower side, with respect to a central position in a door height direction of the glove box door.

3. The knee airbag device for a vehicle of claim 1, wherein due to inflation reaction force at a time when the knee airbag inflates and expands, a vehicle front side of the lower portion of the glove box door is deformed in a curved surface shape that is convex in plan view.

4. The knee airbag device for a vehicle of claim 1, wherein a vehicle equipment part that is supported at a vehicle body is disposed adjacent to a vehicle front side of a main body portion of the glove box.

5. The knee airbag device for a vehicle of claim 1, wherein the glove box is supported, directly or via a bracket, at a vehicle body.

6. The knee airbag device for a vehicle of claim 1, wherein an instrument panel reinforcement, whose longitudinal direction is a vehicle transverse direction, is disposed at a vehicle front side and oblique upper side of the upper portion of the glove box door, and a load transmitting member that transmits, to the instrument panel reinforcement, load substantially toward a vehicle front side that is applied to the upper portion of the glove box door, is disposed between the instrument panel reinforcement and the upper portion of the glove box door.

7. The knee airbag device for a vehicle of claim 1, wherein:
the upper rib is formed within the upper portion of the glove box door and extends in a door thickness direction;
the lower rib is formed within the lower portion of the glove box door and extends in the door thickness direction, and
a rigidity of the lower rib is set to be low as compared with the upper rib.

8. The knee airbag device of claim 7, wherein a thickness of the upper portion of the glove box door is set to be thicker than a thickness of the lower portion thereof.

9. The knee airbag device of claim 1, wherein a main body portion of the glove box is formed in a box shape whose upper surface side is open, and the glove box door is formed integrally with a vehicle rear side surface of the main body portion, and a reinforcing portion is provided at a portion of or an entirety of a peripheral edge portion of an upper end opening portion of the main body portion.

* * * * *